(12) United States Patent
Salvestro

(10) Patent No.: US 8,436,882 B2
(45) Date of Patent: May 7, 2013

(54) IMAGING FEATURES WITH SKEWED EDGES

(75) Inventor: Aldo Salvestro, Burnaby (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 221 days.

(21) Appl. No.: 12/864,509

(22) PCT Filed: Jan. 30, 2008

(86) PCT No.: PCT/IB2008/000215
§ 371 (c)(1),
(2), (4) Date: Jul. 26, 2010

(87) PCT Pub. No.: WO2009/095730
PCT Pub. Date: Aug. 6, 2009

(65) Prior Publication Data
US 2010/0302340 A1    Dec. 2, 2010

(51) Int. Cl.
*B41J 2/47*        (2006.01)
*B41J 2/455*    (2006.01)

(52) U.S. Cl.
USPC ............................... 347/233; 347/225

(58) Field of Classification Search ......... None
See application file for complete search history.

(56) References Cited

U.S. PATENT DOCUMENTS

| 5,438,437 | A | * | 8/1995 | Mizoguchi et al. | 358/518 |
| 5,517,359 | A |   | 5/1996 | Gelbart | |
| 6,124,870 | A | * | 9/2000 | Morimoto | 347/131 |
| 6,682,862 | B1 |  | 1/2004 | Chang et al. | |
| 7,248,278 | B1 | * | 7/2007 | Carlisle et al. | 347/239 |
| 2002/0159008 | A1 |  | 10/2002 | Yoshino et al. | |
| 2005/0024706 | A1 | * | 2/2005 | Gelbart | 359/276 |
| 2006/0102853 | A1 |  | 5/2006 | Heinitz et al. | |
| 2007/0070267 | A1 |  | 3/2007 | Yang | |
| 2007/0115555 | A1 |  | 5/2007 | Nellissen | |
| 2008/0062243 | A1 | * | 3/2008 | Nakagawa | 347/246 |

FOREIGN PATENT DOCUMENTS

EP    754 553 A2    1/1997

* cited by examiner

*Primary Examiner* — Matthew Luu
*Assistant Examiner* — Kendrick Liu
(74) *Attorney, Agent, or Firm* — Nelson Adrian Blish

(57) ABSTRACT

A method for forming an image on media is provided which includes controlling an imaging head to emit radiation beams to form the image while scanning over the media along a scan direction. The image can include a feature that has an edge portion that extends in a direction that is skewed by a skew angle with respect to the scan direction. Each radiation beam can be controllable to vary a size of a pixel formed on the media by the radiation beam. Each pixel has a first size along a first direction and a second size along a second direction that intersects the first direction. In one embodiment, the second size is different than the first size and is determined based at least on the skew angle and the first size.

25 Claims, 18 Drawing Sheets

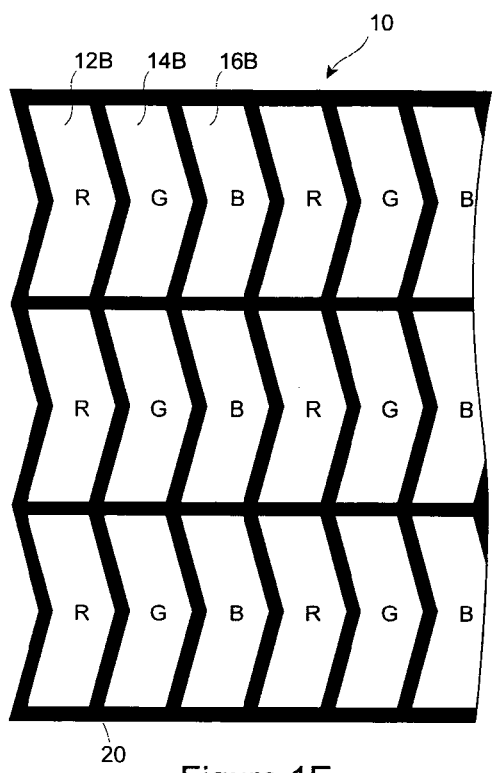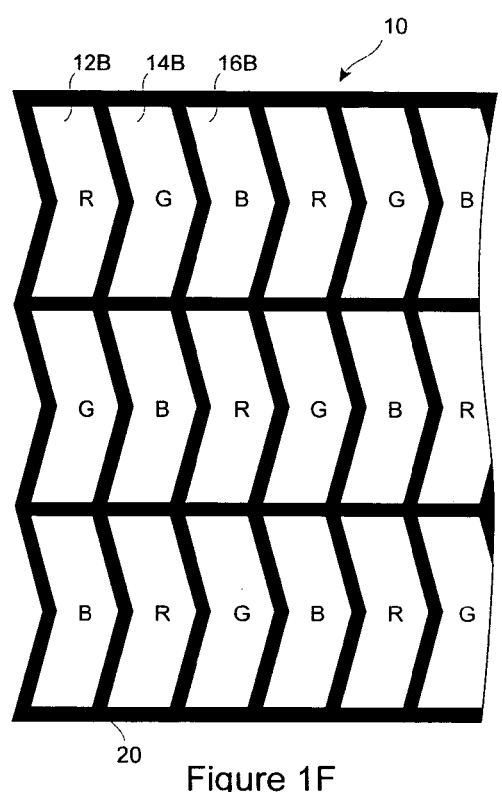
Figure 1E
PRIOR ART
Figure 1F
PRIOR ART

IMAGING FEATURES WITH SKEWED EDGES

CROSS REFERENCE TO RELATED APPLICATIONS

This is a U.S. National Stage application under 35 U.S.C. 371 of International Application No. PCT/IB2008/000215, filed Jan. 30, 2008.

TECHNICAL FIELD

The invention relates to imaging systems and to methods for forming images of features that have edges that are skewed with respect to a desired scanning direction. The invention may be applied to fabricating color filters for electronic displays, for example.

BACKGROUND

Color filters used in display panels typically include a pattern comprising a plurality of color features. The color features may include patterns of red, green and/or blue color features, for example. Color filters may be made with color features of other colors. The color features may be arranged in any of various suitable configurations. Prior art "stripe" configurations have alternating columns of red, green and blue color features as shown in FIG. 1A.

FIG. 1A shows a portion of a prior art "stripe" configuration color filter 10 having a plurality of red, green and blue color features 12, 14 and 16 respectively formed in alternating columns across a receiver element 18. Color features 12, 14 and 16 are outlined by portions of a color filter matrix 20 (also referred to as matrix 20). The columns can be imaged in elongated stripes that are subdivided by matrix cells 31 (also referred to as cells 31) into individual color features 12, 14 and 16. TFT transistors on the associated LCD panel (not shown) may be masked by areas 22 of matrix 20.

Various imaging methods are known in the art and can be used to form various features on media. For example, laser-induced thermal transfer processes have been proposed for use in the fabrication of displays, and in particular color filters. In some manufacturing techniques, when laser-induced thermal transfer processes are used to produce a color filter, a color filter substrate also known as a receiver element is overlaid with a donor element that is then image-wise exposed to selectively transfer a colorant from the donor element to the receiver element. Preferred exposure methods use radiation beams such as laser beams to induce the transfer of the colorant to the receiver element. Diode lasers are particularly preferred for their low cost and small size.

Laser induced "thermal transfer" processes include: laser-induced "dye transfer" processes, laser-induced "melt transfer" processes, laser-induced "ablation transfer" processes, and laser-induced "mass transfer" processes. Colorants transferred during laser-induced thermal transfer processes include suitable dye-based or pigment-based compositions. Additional elements such as one or more binders may be transferred.

Some conventional laser imaging systems produce a limited number of radiation beams. Other conventional systems reduce the time required to complete images by producing many radiation beams with numerous individually-modulated imaging channels. Imaging heads with large numbers of such "channels" are available. For example, a SQUAREspot® model thermal imaging head manufactured by Kodak Graphic Communications Canada Company, British Columbia, Canada has several hundred independent channels. Each channel can have power in excess of 25 mW. An array of imaging channels can be controlled to write an image in a series of image swaths which are arranged to form a continuous image.

Radiation beams are scanned along a scan path to form various images. The visual quality of a formed image can be an important consideration in the selection of a particular imaging process. In applications such as laser-induced thermal transfer of color filter features, the quality of the formed color filter is dependant on imaging features that have substantially the same visual characteristics. For example, one particular visual characteristic can include density (e.g. optical density or color density). Density variations among the imaged color features can lead to objectionable image artifacts. Image artifacts can include banding or color variations in imaged features.

The stripe configuration shown in FIG. 1A illustrates one example configuration of color filter features. Color filters may have other configurations. Mosaic configurations have the color features that alternate in both directions (e.g. along columns and rows) such that each color feature resembles an "island". Delta configurations (not-shown) have groups of red, green and blue color features arranged in a triangular relationship to each other. Mosaic and delta configurations are examples of "island" configurations. FIG. 1B shows a portion of a prior art color filter 10 arranged in a mosaic configuration in which color features 12, 14 and 16 are arranged in columns and alternate both across and along the columns.

Other color filter configurations are also known in the art. Whereas the illustrated examples described above show patterns of rectangular shaped color filter elements, other patterns including other shaped features are also known.

FIG. 1C shows a portion of a prior art color filter 10 with a configuration of triangular shaped color features 12A, 14A and 16A. As illustrated in FIG. 1C, each of the respective color features are arranged along columns and are aligned with matrix 20.

FIG. 1D shows a portion of a prior art color filter 10 with a configuration of triangular shaped color features 12A, 14A and 16A. As illustrated in FIG. 1D, each of the respective color features alternate along the columns and rows of color filter 10. As shown in FIGS. 1C and 1D, color features 12A, 14A and 16A can have different orientations within a given row or column.

FIG. 1E shows a portion of a prior art color filter 10 that includes a configuration of chevron shaped color features 12B, 14B and 16B. As illustrated in FIG. 1E, each of the respective color features are arranged along columns and are aligned with matrix 20. Color features 12B, 14B and 16B are formed from stripes that bend from side to side and are outlined by portions of a color filter matrix 20.

FIG. 1F shows a portion of a prior art color filter 10 that includes a configuration of chevron shaped color features 12B, 14B and 16B. As illustrated in FIG. 1F, each of the respective color features alternate along the columns and rows of color filter 10.

The shape and configuration of a color filter feature can be selected to provide desired color filter attributes such as a better color mix or enhanced viewing angles. Features with edges that are skewed with respect to a desired imaging scan direction can create additional challenges with respect to their fabrication.

In some applications, it is required that the features be formed in substantial alignment with a registration region provided on media. For example, in FIG. 1A the various color features 12, 14 and 16 are to be aligned with a pattern of matrix cells 34 that are provided by matrix 20. Color features 12, 14 and 16 can overlap matrix 20 to reduce backlight leakage effects. In some applications such as color filters, the visual quality of the final product can be dependant upon the accuracy with which a pattern of features (e.g. a pattern of color filter features) is aligned with a pattern of registration sub-regions (e.g. a color filter matrix). Misalignment can lead to the formation of undesired colorless voids or to the overlapping of adjacent features which can result in an undesired color characteristic.

While overlapping a matrix 20 can help to reduce the accuracy with which the color features must be aligned with matrix 20 in color filter applications, there are typically limits to the extent that matrix 20 can be overlapped. Factors that can limit the degree of overlap (and final alignment) can include, but are not limited to: the particular configuration of the color filter, the width of the matrix lines, the roughness of the matrix lines, the overlap required to prevent backlight leakage and post annealing shrinkage.

Factors associated with the particular method employed to form the features can limit the degree of overlap. For example, when laser imaging methods are employed, the accuracy with which the laser imager can scan the color filter will have a bearing on the final alignment obtained. The imaging resolution with which the features can be imaged also has a bearing on the final registration. Imaging resolution is related to a size characteristic of a pixel formed by a corresponding radiation beam.

There remains a need for effective and practical imaging methods and systems that lead to the formation of high-quality images of features. Various portions of these features can have different orientations with respect to a scanning direction. Various edges of these features can be skewed with respect to a direction of a scan path.

There remains a need for effective and practical imaging methods and systems that can form features in substantial alignment with a pattern of registration sub-regions provided on media. Various edges of these features can be skewed with respect to a direction of the scan path. The features can be part of a color display.

SUMMARY OF THE INVENTION

The present invention relates to a method for forming an image on a media while the media is moved relative to a radiation beam. The media can include a pattern of registration sub-regions, such as, for example, a matrix. The image can include one or more patterns of features, such as color features for a color filter or colored illumination sources as part of an organic light emitting diode display. The one or more patterns of features can be aligned with the pattern of registration sub-regions. The features could be island features wherein each feature of a first plurality of features of a first color is separated from each other feature of the first color by a feature of a different color. The features can be stripes which may or may not be interrupted in one or more directions. The edges of the features can be skewed with respect to an arrangement direction of imaging channels of an imaging head. The features could be chevron shaped.

The images can be formed by a laser-induced thermal transfer process such as a laser-induced dye-transfer process, a laser induced mass transfer process or by other means of transferring material from a donor element to a receiver element.

In one embodiment of the present invention a method for forming an image on media includes controlling an imaging head to emit radiation beams to form the image while scanning over the media along a scan direction. The image can include a feature that has an edge portion that extends in a direction that is skewed by a skew angle with respect to the scan direction. Each radiation beam can be controllable to vary a size of a pixel formed on the media by the radiation beam. In accordance with one embodiment of the invention, at least one size of each pixel of a plurality of pixels to be formed on the media is determined. Each pixel has a first size along a first direction and a second size along a second direction that intersects the first direction. The second direction may or may not be substantially perpendicular to the first direction. The second direction may or may not be parallel to the scan direction. The second size is different than the first size and is determined based at least on the skew angle. The imaging head can be controlled to emit a group of the radiation beams to form a stair-case arrangement of the plurality of pixels along the edge portion of the feature. Each radiation beam of the group of the radiation beams is controlled to form each of the pixels of the stair-case arrangement with the first size and the determined second size. The stair-case arrangement may include a pitch angle that is equal to the skew angle. In one embodiment, at least two pixels of the plurality of pixels are formed at the same time. Each of the first size and the second size can be along an edge of a pixel.

In one embodiment, the second size can be determined based on the pitch of the features along the first direction or the second direction. The second size can be determined based at least upon the relationship: $N*D=(M*C)/\tan(\theta)$, where C is the size of the pixel along the first direction, D is the size of the pixel along the second direction, $\theta$ is an angle corresponding to the skew angle, M is an integer greater than, or equal to one and N is an integer greater than, or equal to one.

In another embodiment, the imaging head can be controlled to form one or more additional pixels on the media. Each of the one or more additional pixels can have a different size than each of the pixels in the stair-cased arrangement of pixels. The stair-case arrangement of the pixels can repeat along a direction that is parallel to the direction in which the edge portion extends. The duration of time during which each radiation beam of the group of the radiation beams is emitted can be controlled to form each pixel of the plurality pixels with a size equal to one of the first size and the determined second size.

In one embodiment, each radiation beam of the group of the radiation beams forms a corresponding radiation spot on the media. The duration of time during which each of the radiation spots is scanned across the media is controlled to form each pixel of the plurality pixels with a size equal to one of the first size and the determined second size.

In another embodiment, each radiation beam of the group of the radiation beams forms a corresponding radiation spot on the media and each of the radiation spots is positioned at an angle about an axis that intersects a surface of the media over which the group of the radiation beams are scanned to form each pixel of the plurality pixels with a size equal to one of the first size and the determined second size. The imaging head can be rotated to form the pixels of the desired size. Alternatively, each of the radiation spots can be magnified or de-magnified to form each pixel of the plurality pixels with a size equal to one of the first size and the determined second size.

The intensity of the radiation beams can also be controlled and varied to form the different pixels or different portions of the features. The intensity may or may not be below an intensity threshold of the media.

A program product carrying a set of computer-readable signals can be used to carry out the methods described above.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

FIG. 1E is a plan view of a portion of a prior art filter including chevron shaped features;

FIG. 1F is a plan view of a portion of another prior art filter including chevron shaped features;

DETAILED DESCRIPTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 2:
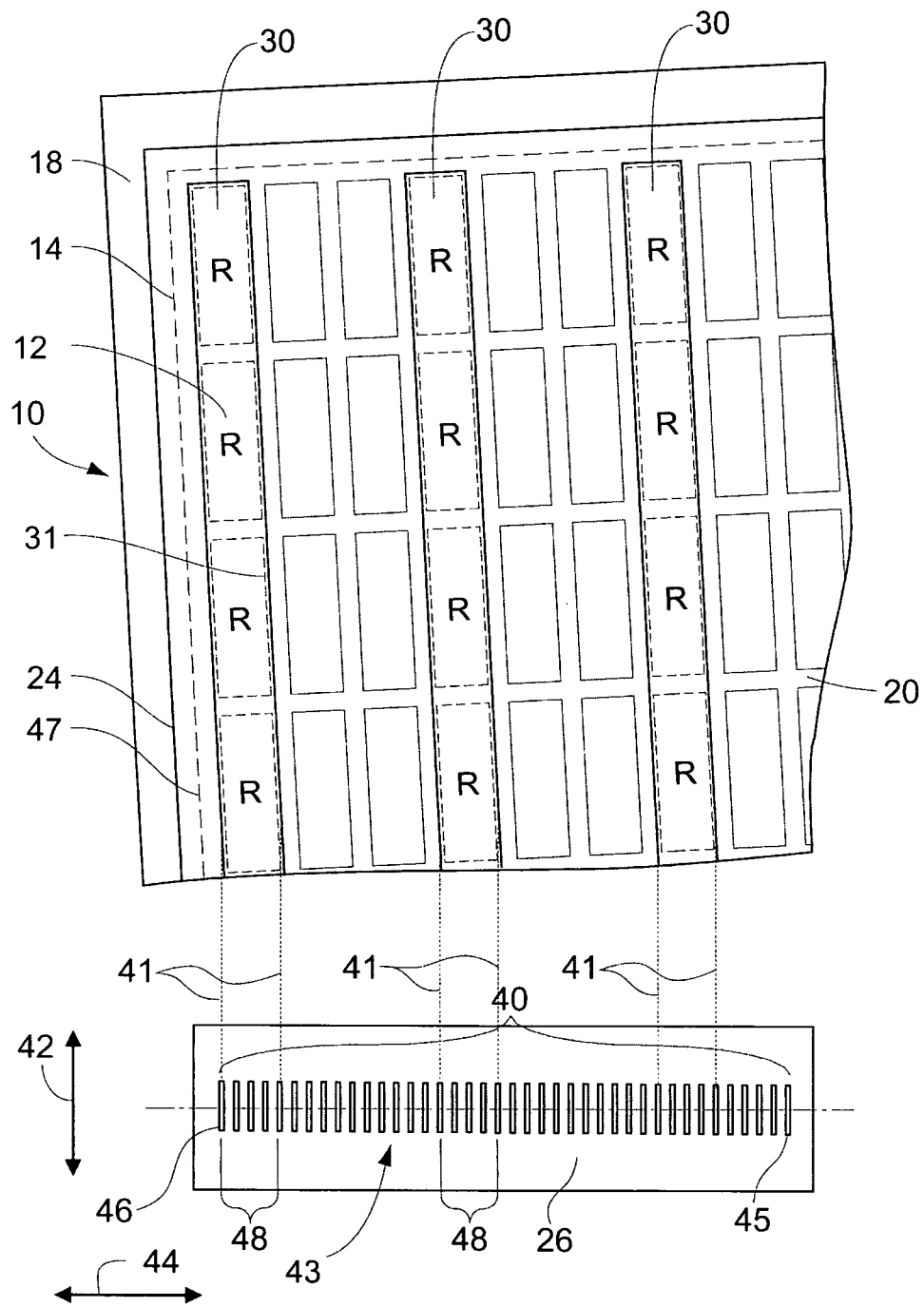
FIG. 2 is a schematic representation of a multi-channel head imaging a pattern of features onto imageable media in a conventional thermal transfer process.

FIG. 2 schematically shows a conventional laser-induced thermal transfer process being used to fabricate a color filter 10. An imaging head 26 is provided to transfer image-forming material (not shown) from a donor element 24 to an underlying receiver element 18. Donor element 24 is shown as being smaller than receiver element 18 for the purposes of clarity only. Donor element 24 may overlap one or more portions of receiver element 18 as may be required. Imaging head 26 can include an arrangement of several imaging channels. In this case, imaging head includes a channel array 43 of individually addressable channels 40.

Receiver element 18 can include a registration region with which it is desired to form images of one or more features in substantial alignment. Receiver element 18 can include a pattern of registration sub-regions with which it is desired to form images of one or more features in substantial alignment. In this case, receiver element 18 includes a registration region 47 (schematically represented in large broken lines). In this case, registration region 47 includes a color filter matrix 20. Matrix 20 is an example of a pattern of registration sub-regions. Although a laser-induced thermal transfer process could be used to form matrix 20 on receiver element 18, matrix 20 is typically formed by lithographic techniques.

Image-forming material can be image-wise transferred onto the receiver element 18 when radiation beams emitted by imaging head 26 are scanned across donor element 24. Red, green and blue portions of filter 10 are typically imaged in separate imaging steps; each imaging step involving replacing the preceding color donor element with the next color donor element to be imaged. Each of the red, green and blue features of the filter is to be transferred to receiver element 18 in substantial alignment with a corresponding matrix cell 31. After the color features have been transferred, the imaged color filter may be subjected to one or more additional process steps, such as an annealing step, for example, to change one or more physical properties (e.g. hardness) of the imaged color features.

Figure 3:
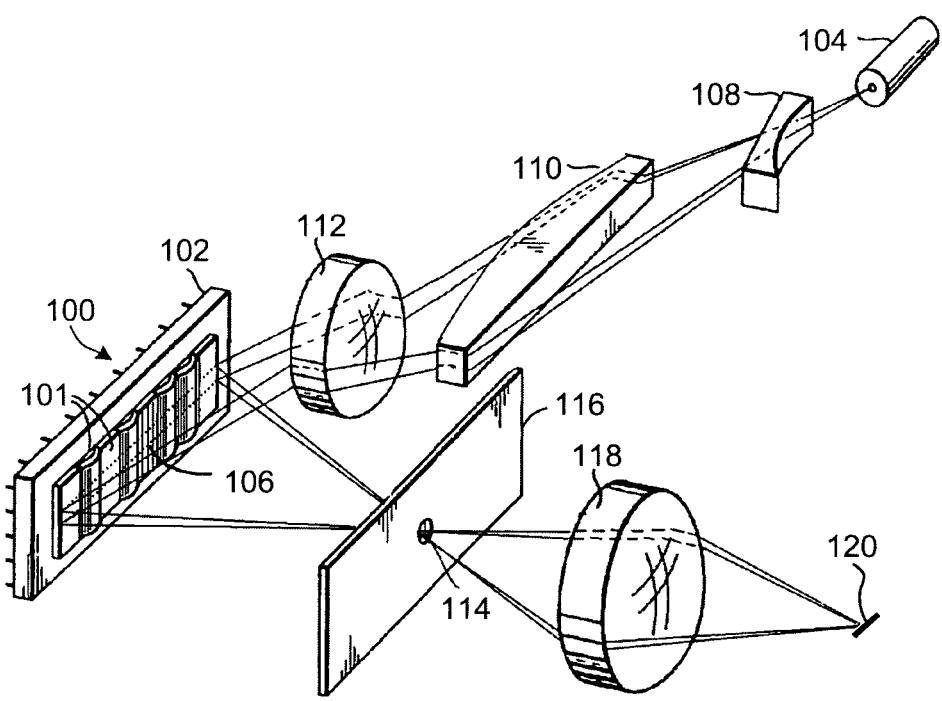
FIG. 3 is a schematic perspective view of the optical system of an example prior art multi-channel imaging head.

An example of an illumination system employed by a conventional laser-based multi-channel imaging process is schematically shown in FIG. 3. A spatial light modulator or light valve is used to create a plurality of imaging channels. In the illustrated example, linear light valve array 100 includes a plurality of deformable mirror elements 101 fabricated on a semi-conductor substrate 102. Mirror elements 101 are individually addressable. Mirror elements 101 can be micro-electro-mechanical (MEMS) elements, such as deformable mirror micro-elements, for example. A laser 104 can generate an illumination line 106 on light valve 100 using an anamorphic beam expander comprising cylindrical lenses 108 and 110. Illumination line 106 is laterally spread across the plurality of elements 101 so that each of the mirror elements 101 is illuminated by a portion of illumination line 106. U.S. Pat. No. 5,517,359 to Gelbart describes a method for forming an illumination line.

A lens 112 typically focuses laser illumination through an aperture 114 in an aperture stop 116 when elements 101 are in their un-actuated state. Light from actuated elements is blocked by aperture stop 116. A lens 118 images light valve 100 to form a plurality of individual image-wise modulated beams 120, which can be scanned over the area of a substrate to form an imaged swath. Each of the beams is controlled by one of the elements 101. Each element 101 corresponds to an imaging channel of a multi-channel imaging head.

Each of the beams is operable for imaging, or not imaging, an "image pixel" on the imaged receiver element in accordance with the driven state of the corresponding element 101. That is, when required to image a pixel in accordance with the image data, a given element 101 is driven to produce a corresponding radiation beam with an intensity magnitude and duration suitable for forming a pixel image on the substrate. When required not to image a pixel in accordance with the image data, a given element 101 is driven to not produce a radiation beam. As used herein, pixel refers to a single unit element of image on the substrate, as distinguished from the usage of the word pixel in connection with a portion of an image displayed on an assembled display device. For example, if the present invention is used to create a filter for a color display, the pixels created by the present invention will be combined with adjacent pixels, to form a single pixel (also referred to as a feature) of an image displayed on the display device.

FIG. 2 shows a portion of a color filter receiver element 18 that has been conventionally patterned with a plurality of red stripe features 30 in a laser-induced thermal transfer process. FIG. 2 depicts the correspondence between imaging channels 40 and the transferred pattern as broken lines 41. Features, such as stripe features 30 generally have sizes that are greater than a width of a pixel imaged by an imaging channel 40. The radiation beams generated by imaging head 26 are scanned over receiver element 18 while being image-wise modulated according to image data specifying the pattern of features to be written. Groups 48 of channels are driven to produce radiation beams wherever it is desired to form a feature. Channels 40 not corresponding to the features are driven so as not to image corresponding areas. Accordingly, a radiation beam is emitted every time an imaging channel is turned on. Thus, as an imaging channel is turned on and off, each time the channel is turned on, a new radiation beam is emitted from that channel.

Receiver element 18, imaging head 26, or a combination of both, are moved relative to one another while imaging channels 40 are controlled in response to image data to create images. In some cases, imaging head 26 is stationary and receiver element 18 is moved. In other cases, receiver element 18 is stationary and imaging head 26 is moved. In still other cases, both the imaging head 26 and the receiver element 18 are moved.

Imaging channels 40 can be activated to form an image swath during a scan of imaging head 26. Receiver element 18 can be too large to be imaged within a single image swath. Therefore, multiple scans of imaging head 26 are typically required to complete an image on receiver element 18.

Movement of imaging head 26 along sub-scan axis 44 may occur after the imaging of each swath is completed along main-scan axis 42. Alternatively, with a drum-type imager, it may be possible to relatively move imaging head 26 along both the main-scan axis 42 and sub-scan axis 44, thus writing the image swath extending helically on the drum. In FIG. 2, relative motion between imaging head 26 and receiver element 18 is provided along a path aligned with main-scan axis 42 and along a path aligned with sub-scan axis 44.

Any suitable mechanism may be applied to move imaging head 26 relative to receiver element 18. Flat bed imagers are typically used for imaging receiver elements 18 that are relatively rigid, as is common in fabricating display panels. A flat bed imager has a support that secures a receiver element 18 in a flat orientation. U.S. Pat. No. 6,957,773 to Gelbart describes a high-speed flatbed imager suitable for display panel imaging. Alternatively, flexible receiver elements 18 can be secured to either an external or internal surface of a "drum-type" support to affect the imaging of the image swaths.

In FIG. 2, matrix 20 is skewed with respect to main-scan axis 42 and sub-scan axis 44. Matrix 20 is skewed with respect to an arrangement direction of imaging channels 40. In this case, stripe features 30 are required to be formed in a skewed manner to be correctly aligned with matrix 20. Skewed feature or features with skewed edges have been conventionally imaged by establishing controlled relative motion between receiver element 18 and imaging head 26 as radiation beams are directed along scan paths. In this case, sub-scan motion is coordinated with main-scan motion in accordance with the degree of skew. As main-scan motion is provided between imaging head 26 and receiver element 18, synchronous sub-scan motion between the two is also provided to create a motion referred to as "coordinated motion". Unlike drum-based imaging methods where image swaths are imaged in a helical fashion in which the amount of sub-scan motion during each drum rotation is typically defined independently of the image to be formed, the amount of sub-scan motion during each scan is dependant on the image to be formed when coordinated motion techniques are employed. Coordinated motion can be used to form features with edges that are substantially smooth and continuous which in some demanding applications can be used to facilitate an alignment of a pattern of features with a pattern of registration sub-regions. As shown in FIG. 2, portions of each stripe feature 30 overlap various lines of matrix 20.

Figure 4:
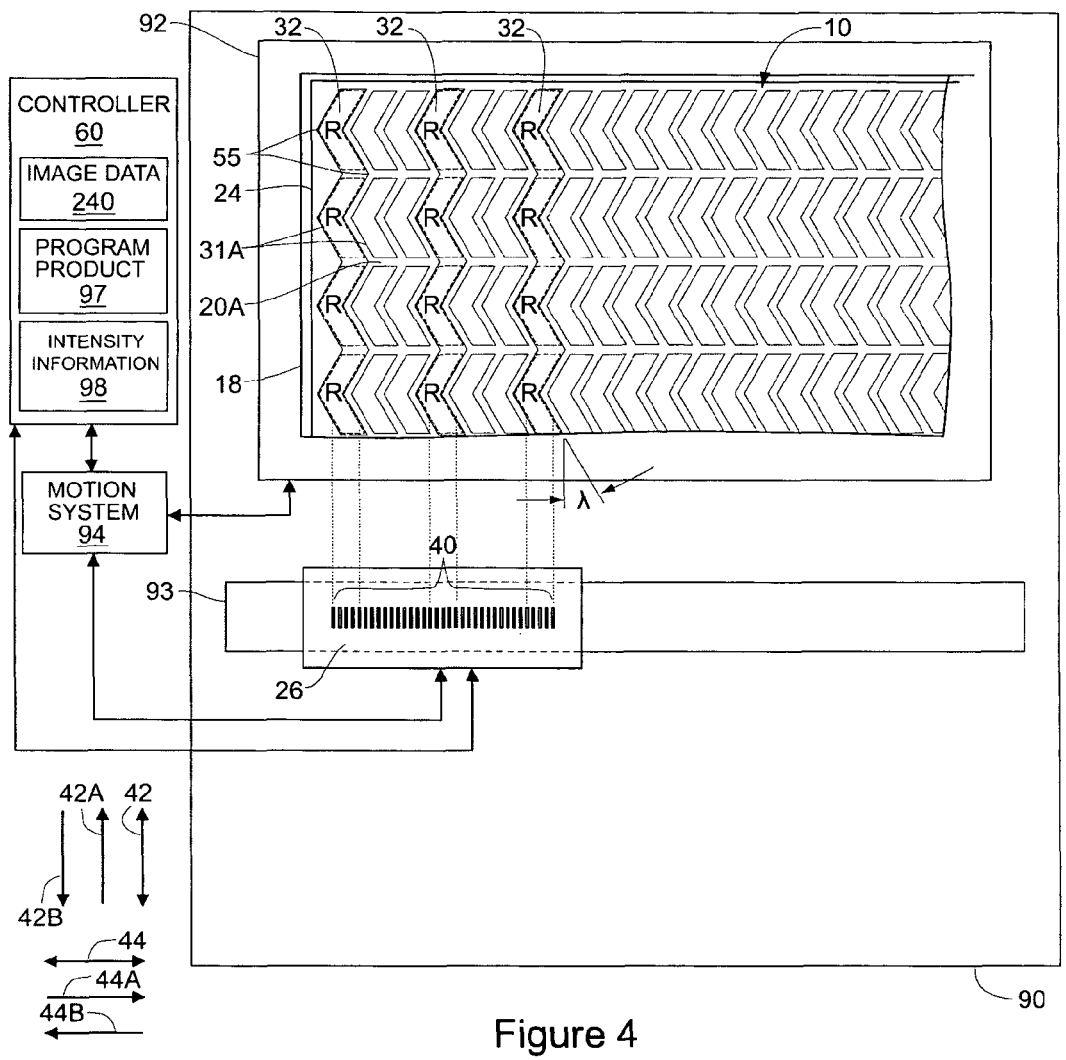
FIG. 4 schematically shows an apparatus 90 used in an example embodiment of the invention.

FIG. 4 schematically shows an apparatus 90 used in an example embodiment of the invention. Apparatus 90 is operable for forming images on receiver element 18. In this example embodiment of the invention, images are formed on receiver element 18 by operating imaging head 26 to direct radiation beams while scanning over receiver element 18. Apparatus 90 includes carrier 92 which is operable for conveying receiver element 18 along a path aligned with main-scan axis 42. Carrier 92 can move in a reciprocating fashion. In this example embodiment of the invention, carrier is movable in a forward direction 42A and a reverse direction 42B. Imaging head 26 is movably arranged on a support 93 that straddles carrier 92. Imaging head 26 is controlled to move along paths aligned with sub-scan axis 44. In this example embodiment of the invention imaging head 26 can be controlled to move along support 93. Imaging head 26 is movable in away direction 44A and in home direction 44B. Apparatus 90 forms images by bi-directionally scanning receiver element 18.

In this example embodiment of the invention, a laser induced thermal transfer process is employed. Imaging head 26 is controlled to scan the media with a plurality of radiation beams to cause an image forming material (not shown) to be transferred from donor element 24 to receiver element 18. Imaging electronics (not shown) control the imaging channels 40 to regulate the emission of the radiation beams. Motion system 94 (which can include one or more motion systems) includes any suitable drives, transmission members, and/or guide members to cause the motion of carrier 92. In this example embodiment of the invention, motion system 94 controls the motion of imaging head 26 and controls the motion of carrier 92. Those skilled in the related art will realize that separate motion systems can also be used to operate different systems within apparatus 90.

Controller 60, which can include one or more controllers, is used to control one or more systems of apparatus 90 including, but not limited to, motion system 94 used by carrier 92 and imaging head 26. Controller 60 can also control media handling mechanisms that can initiate the loading and/or unloading of receiver element 18 and donor element 24. Controller 60 can also provide image data 240 to imaging head 26 and control imaging head 26 to emit radiation beams in accordance with this data. Various systems can be controlled using various control signals and/or by implementing various methods. Controller 60 can be configured to execute suitable software and can include one or more data processors, together with suitable hardware, including by way of non-limiting example: accessible memory, logic circuitry, drivers, amplifiers, A/D and D/A converters, input/output ports and the like. Controller 60 can comprise, without limitation, a microprocessor, a computer-on-a-chip, the CPU of a computer or any other suitable microcontroller.

FIG. 4 schematically shows a portion of a color filter 10 including a plurality of stripe features 32 and a matrix 20A. For clarity, only red (R) stripe features are shown. Stripe features 32 include various portions that are skewed with respect to an arrangement direction of imaging channels 40 of imaging head 26. It is desired that imaging head 26 be controlled to image donor element 24 to transfer an image forming material to receiver element 18 to form the "zigzag" like stripe features 32. Color filter features comprising a chevron shape are defined by each matrix cell 31A in areas corresponding to the transferred stripe features 32.

Although it is possible to form stripe features 32 by employing conventional coordinated motion techniques, these techniques can reduce the productivity of the imaging process. Coordinated motion techniques used during the imaging of features such as the zigzag stripe features 32 would require a reciprocating form of motion. For example, as imaging head 26 is moved relative to receiver element 18 along a path aligned with main-scan axis 42, imaging head 26 would need to synchronously reciprocate with respect to receiver element 18 along a path aligned sub-scan axis 44 to follow the zigzag shaped features. The movement mechanism used to establish the required main-scan and sub-scan relative motions would need to deal with high deceleration and accelerations that would be required to move about the various corners (e.g. corner 55) of each stripe feature 32. The following equations can be use to illustrate this:

$$V_{subscan} = V_{mainscan} * \tan \lambda, \quad (1)$$

where:
$V_{subscan}$ is the relative sub-scan speed of the coordinated motion,
$V_{mainscan}$ is the relative main-scan speed of the coordinated motion, and $\lambda$ is an angle corresponding to the degree of inclination of the feature portions as measured with respect to the main-scan axis;

$$t = V_{subscan}/A_{subscan}, \quad (2)$$

where:
t is the time required to reduce $V_{subscan}$ to zero at a point (e.g. corner 55) about which the sub-scan motion is reciprocated, and
$A_{subscan}$ is the deceleration required to establish change between $V_{subscan}$ and a zero speed at the reciprocation point, and $$d = V_{mainscan} * t, \quad (3)$$

where:
d is the distance traveled in the main-scan direction during time t.

By recombining equations (1), (2) and (3), distance d can be expressed as:

$$d = (V_{mainscan}^2 * \tan \lambda)/A_{subscan}. \quad (4)$$

For typical conditions of $V_{mainscan}=1$ m/sec, $A_{subscan}=5$ m/sec² and an angle $\lambda=30$ degrees, a distance d=115.5 mm would be required to reach a reciprocation point. For some demanding applications involving features comprising "inclined" feature portions, reciprocated coordinated motion would not practical. For example, in color filter applications, chevron shaped color features can include inclined portions that are a hundred microns or so in length. A deceleration distance "d" measured in millimeters would not be suitable for the imaging of such small features.

Other methods that can be employed to image skewed features or features with skewed edges include approximating the formed edges with "stair-case" arrangements of pixels. Unlike imaging methods employing coordinated motion techniques, these techniques can result in the formation of features with edges that are not smooth, but rather, jagged or stair-case in appearance. Imaging head 26 can be controlled to form a two dimensional grid of image pixels on receiver element 18. Skewed feature edges are imaged approximately by stair-case arrangements of the pixels whose placement is governed by the grid.

Aligning a pattern of features with a pattern of registration sub-regions can create additional challenges for the imaging process employed to form the features. For example, in color filter applications, each color feature needs be formed in substantial alignment with a cell belonging to a pattern of color filter matrix cells. Although overlapping portions of the matrix lines may help to reduce the accuracy with which the color features must be aligned with the pattern of matrix cells, there are typically limits to the extent that a matrix can be overlapped. The imaging process itself can have an effect on the degree of overlap that is permitted. For example, the visual quality of an image produced in a laser-induced thermal transfer process is typically sensitive to the uniformity of the interface between the donor element and receiver element. Non-uniform interfaces can affect the amount of image forming material that is transferred from the donor element to the receiver element. If adjacent features overlap one another over matrix lines, the donor-to-receiver element spacing can additionally vary in the overlapped regions as a function of the additional material that has been transferred to these regions. This added spacing can adversely impact the visual quality of features that are formed during a subsequent imaging with additional donor elements. In this regard, it is typically preferred that adjacent features not overlap each other over a matrix portion. This requirement places additional alignment constraints on the required alignment between the pattern of repeating color features and the repeating pattern of matrix cells.

Figure 1A:
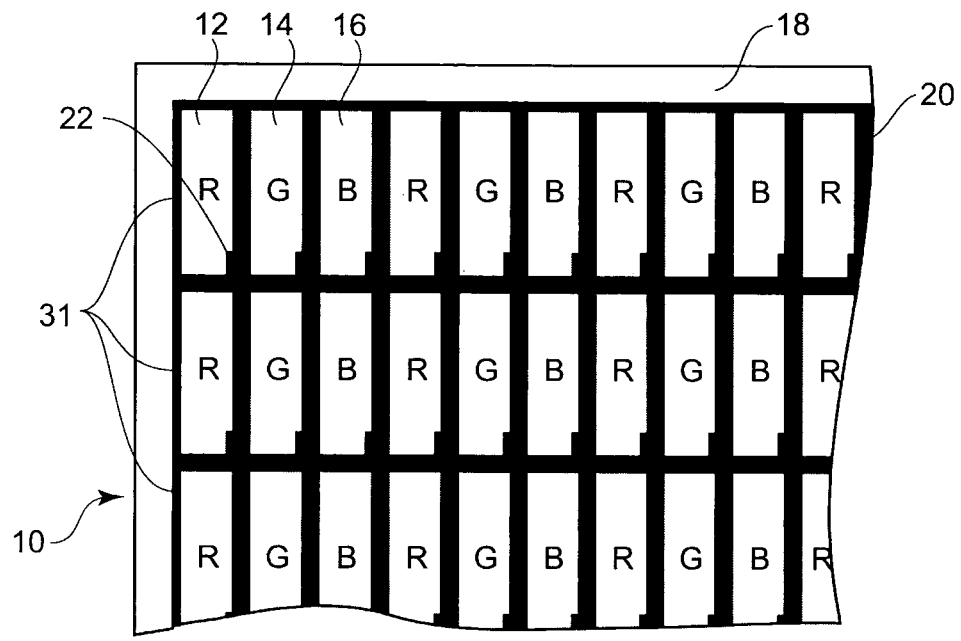
FIG. 1A is a plan view of a portion of a prior art color filter.
Figure 1B:
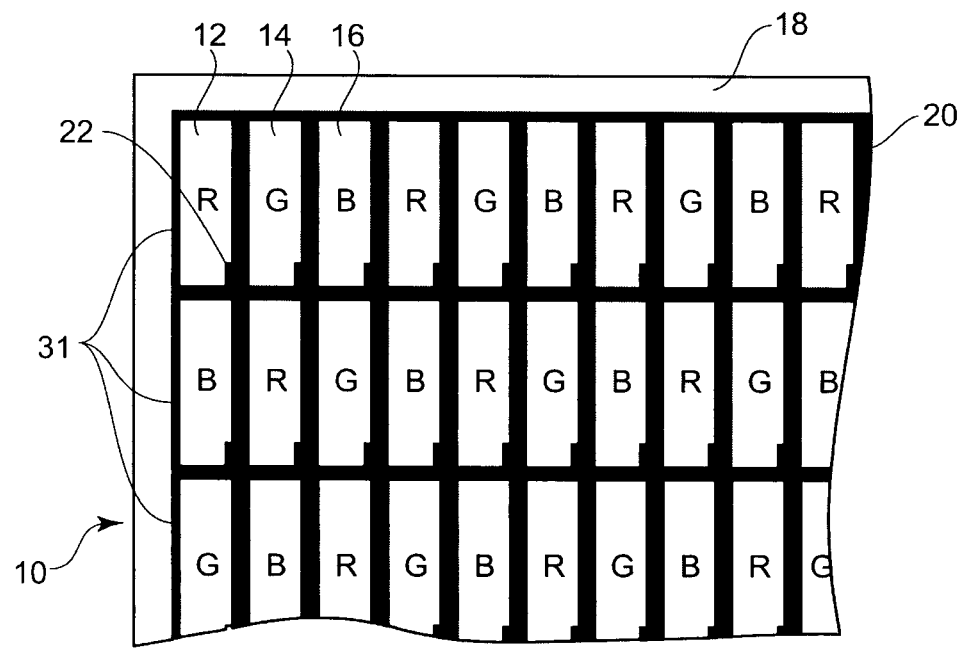
FIG. 1B is a plan view of a portion of another prior art color filter.
Figure 1C:
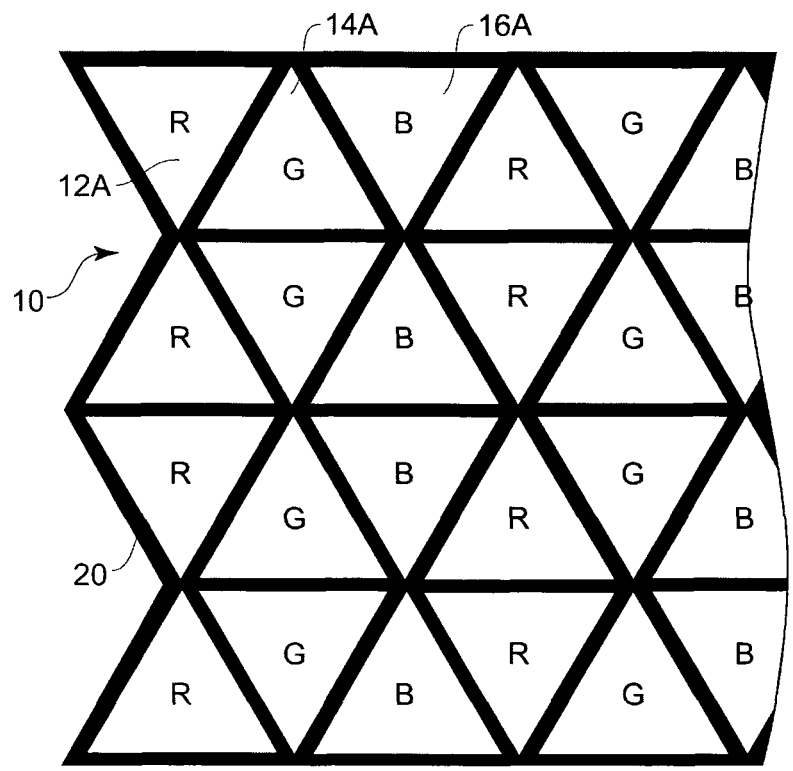
FIG. 1C is a plan view of a portion of a prior art filter including triangular shaped features.
Figure 1D:
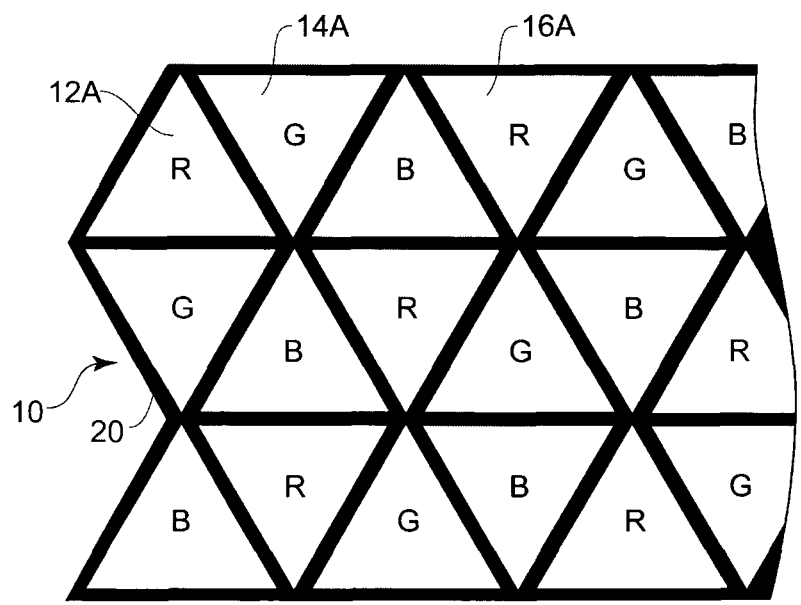
FIG. 1D is a plan view of a portion of another prior art filter including triangular shaped features.
Figure 5A:
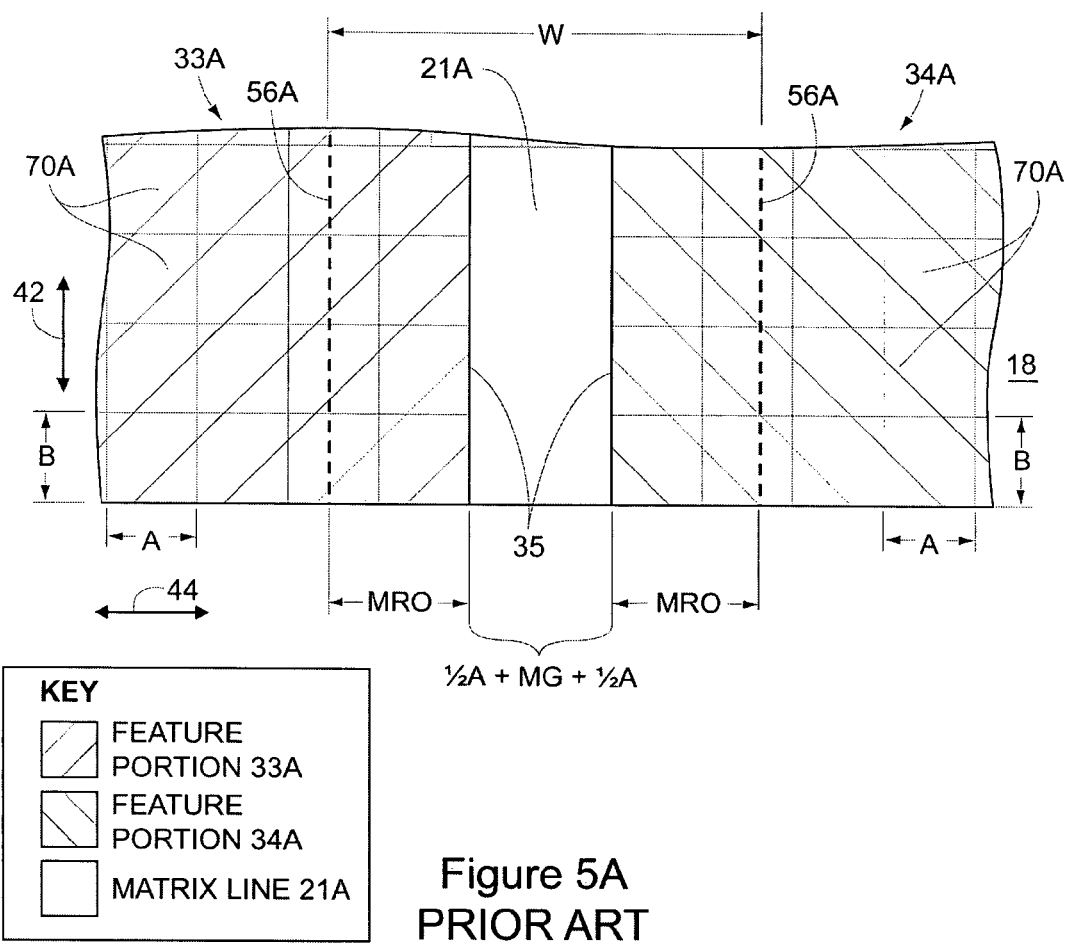
FIG. 5A schematically shows a tolerance budget associated with a conventional formation of a plurality of feature portions on a receiver element that includes a matrix line that is parallel to a scanning direction.

FIG. 5A schematically shows a tolerance budget associated with a conventional formation of a first feature portion 33A and a second feature portion 34A in an overlapped relationship with a matrix line 21A. In this example, feature portions 33A and 34A are part of a stripe feature configuration color filter (similar to the color filter shown in FIG. 1A). Feature portion 33A corresponds to a first color (e.g. red) while feature portion 34A corresponds to another color (e.g. green). The stripe features extend in a scan direction which in this case is parallel to main-scan axis 42. Each of the feature portions 33A and 34A are formed by a plurality of image pixels 70A formed by radiation beams on a receiver element. Each pixel 70A has a first size A in a first direction and a second size B in a second direction that intersects the first direction. In this case, the first direction is parallel to sub-scan axis 44 and the second direction is parallel to main-scan axis 42. In this case, first size A is equal to second size B. Each of the feature portions 33A and 34A overlap matrix line 21A.

Feature portions 33A and 34A and matrix line 21A are patterned or shaded for clarity in accordance with the KEY shown in FIG. 5A.

The illustrated tolerance budget takes into account various factors that can be considered when imaging color filter features such that they are aligned with a matrix line 21A without overlapping one another. For example, each of the features portions 33A and 34A are to be formed such that they overlap matrix line 21A by a certain amount to achieve a desired quality characteristic of the color filter. In this case, each of the feature portions 33A and 34A is required to overlap matrix line 21A by a minimum required overlap (MRO) distance. Distance MRO can be dependent on various factors. One possible factor is the imaging accuracy of the imaging system used to image features portions 33A and 34A. The imaging accuracy can be affected by the mechanical repeatability associated with the positioning of the imaging head (not shown in FIG. 5A) during the imaging process, variations in the radiation beam characteristics and the edge roughness of the resulting images that are formed. Another possible factor is the matrix line repeatability which represents the variation in location of the matrix line 21A with respect to the receiver element 18 upon which it has been formed. Another possible factor includes an absolute minimum required overlap required for various additional issues (e.g. feature shrinkage during an annealing process). Distance MRO can also be dependant on other factors. MRO boundary lines 35 are shown with respect to corresponding overlapped edges 56A (shown in broken lines) of matrix line 21A.

FIG. 5A shows that each of the feature portions 33A and 34A are separated from one another by a minimum gap MG. Minimum gap MG is budgeted to prevent feature portions 33A and 34A from overlapping each other over matrix line 21A during their formation. Minimum gap MG is typically governed by the imaging repeatability associated with the imaging of each of the feature portions 33A and 34A. The imaging repeatability can be dependant on various factors which can include the mechanical repeatability of the imaging system (e.g. the mechanical repeatability of the media and imaging head positioning system, and beam drift arising from thermal effects and the like).

FIG. 5A shows that the budget also takes into account the imaging resolution (A) of the imaging system. In this example the imaging resolution A is referenced to a direction which intersects the scanning direction (i.e. a cross-scan direction). In this example, the cross scan direction is parallel to sub-scan axis 44. The ability to control the size of each of the imaged feature portions 33A and 34A is function of pixel size. For example, effectively changing the size of each of the feature portions 33A and 34A by one pixel effectively means that the position of an edge of each feature changes by one-half pixel with respect to a corresponding edge 56A of matrix line 21A. A half pixel of margin (i.e. ½ of the resolution A) between the minimum gap MG and the minimum required overlap MRO can be required for the imaging of each of the feature portions. Accordingly, a minimum width W of matrix line 21A required to image feature portions 33A and 34A can be estimated by the following equation for a stripe configuration color filter:

$$\text{Width}(W) = (2*\text{MRO}) + (2*\tfrac{1}{2}A) + (MG) \quad (5)$$

Figure 5B:
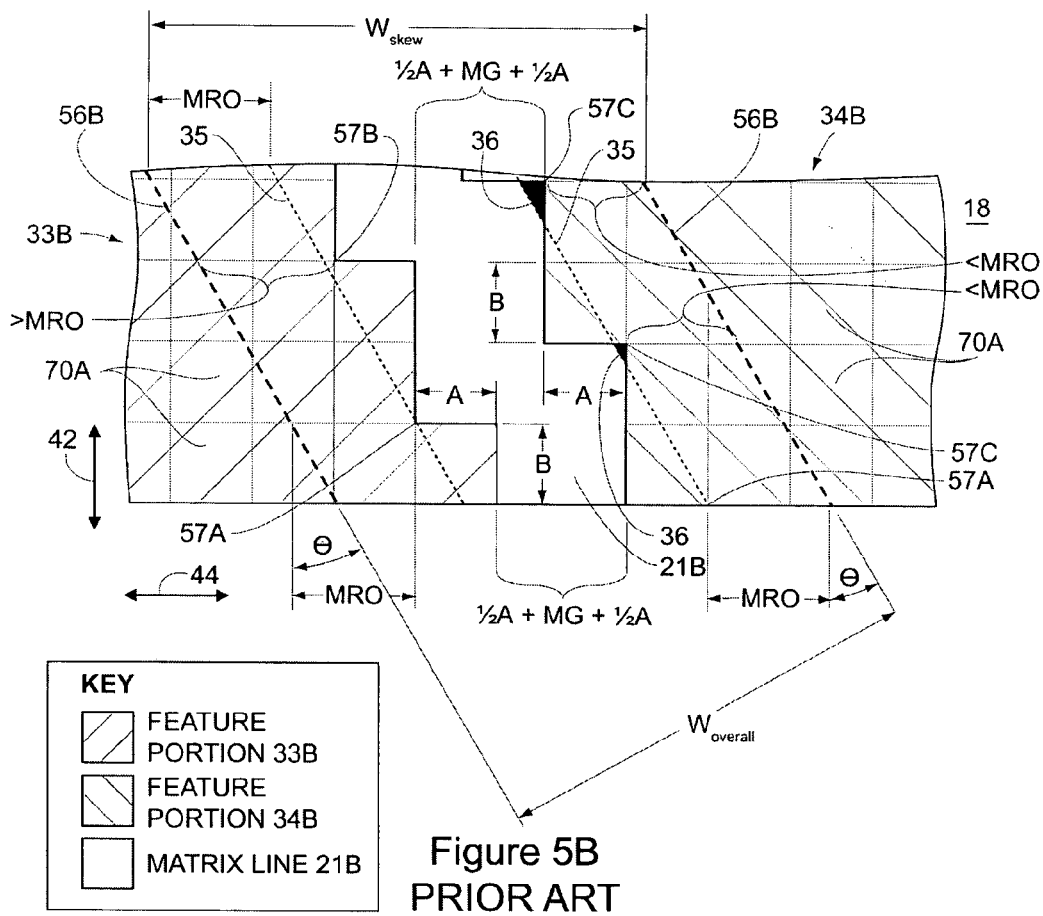
FIG. 5B schematically shows a tolerance budget associated with a conventional formation of a plurality of feature portions on a receiver element that includes a matrix line that is skewed with respect to a scanning direction.

Additional issues can arise when skewed features or features with skewed edges are formed with stair-cased arrangements of pixels. FIG. 5B schematically shows a tolerance budget associated with a conventional formation of a first feature portion 33B and a second feature portion 34B in an overlapped relationship with a skewed matrix line 21B whose edges 56B are represented by large broken lines. Feature portions 33B and 34B and matrix line 21B are patterned or shaded for clarity in accordance with the KEY shown in FIG. 5B. Edges 56B are skewed by an angular value equal to θ as referenced with a scanning direction which is parallel to main-scan axis 42 in this example. Features portions 33B and 34B are part of different features that have edges that are skewed with respect to a desired scanning direction of the imaging system. FIGS. 1C, 1D, 1E and 1F show examples of color filter features that can have various edge portions that could be skewed with respect to a scanning direction of one or more radiation beams used to form the features. Feature portions 33B and 34B were formed with various stair-cased arrangements of pixels 70A which are identical in size to pixels 70A shown in FIG. 5A.

The tolerance budget shown in FIG. 5B is similar to that shown in FIG. 5A in that similar budgets for MRO, MG and the ½ resolutions A are shown. The tolerance budget shown in FIG. 5B does differ however from that of FIG. 5A in some respects. For example, an additional resolution A corresponding to the "step size" is required to establish the stair-case arrangement of pixels. The stair-case arrangement of pixels creates stepped edges in which each step has a run (i.e. the run being aligned with sub-scan axis 44 in this example) which is a function of pixel size A. The position of the staggered portions of the formed edges additionally changes by multiples of a pixel size. The stair-cased edges of feature portions 33B and 34B are shown in a nested relationship with respect to one another to establish feature-to-feature gaps that meet the MG+A requirements.

When compared with FIG. 5A, the cross-scan width $W_{skew}$ of skewed matrix line 21B is greater than the width W of matrix line 21 to accommodate the stair case arrangement of pixels formed at the edges of the features. Larger matrix line widths in the cross-scan direction can be required when imaging color features with skewed edges. $W_{skew}$ can vary as a function of the overall matrix line $W_{Overall}$ and angle θ. For some values of θ, $W_{Overall}$ can be required to be greater than size W shown in FIG. 5A. There is a desire in the color filter industry to employ increasingly thinner matrix line widths.

MRO boundary lines 35 (represented by small broken lines) define the minimum required overlap of each of the feature portions 33B and 34B with respect to each of the matrix line edges 56B. As shown in FIG. 5B, the stair-case arrangement of pixels causes various amounts of overlap at various locations. For example, the MRO requirements are met at locations 57A, are exceeded at location 57B and are not met at locations 57C. Feature portion 34B does not fully overlap matrix line 21B at locations 57C resulting in the formation of non-overlapped regions 36 (darkened for clarity). These non-overlapped regions can cause visual artifacts in the color filter.

Figure 5C:
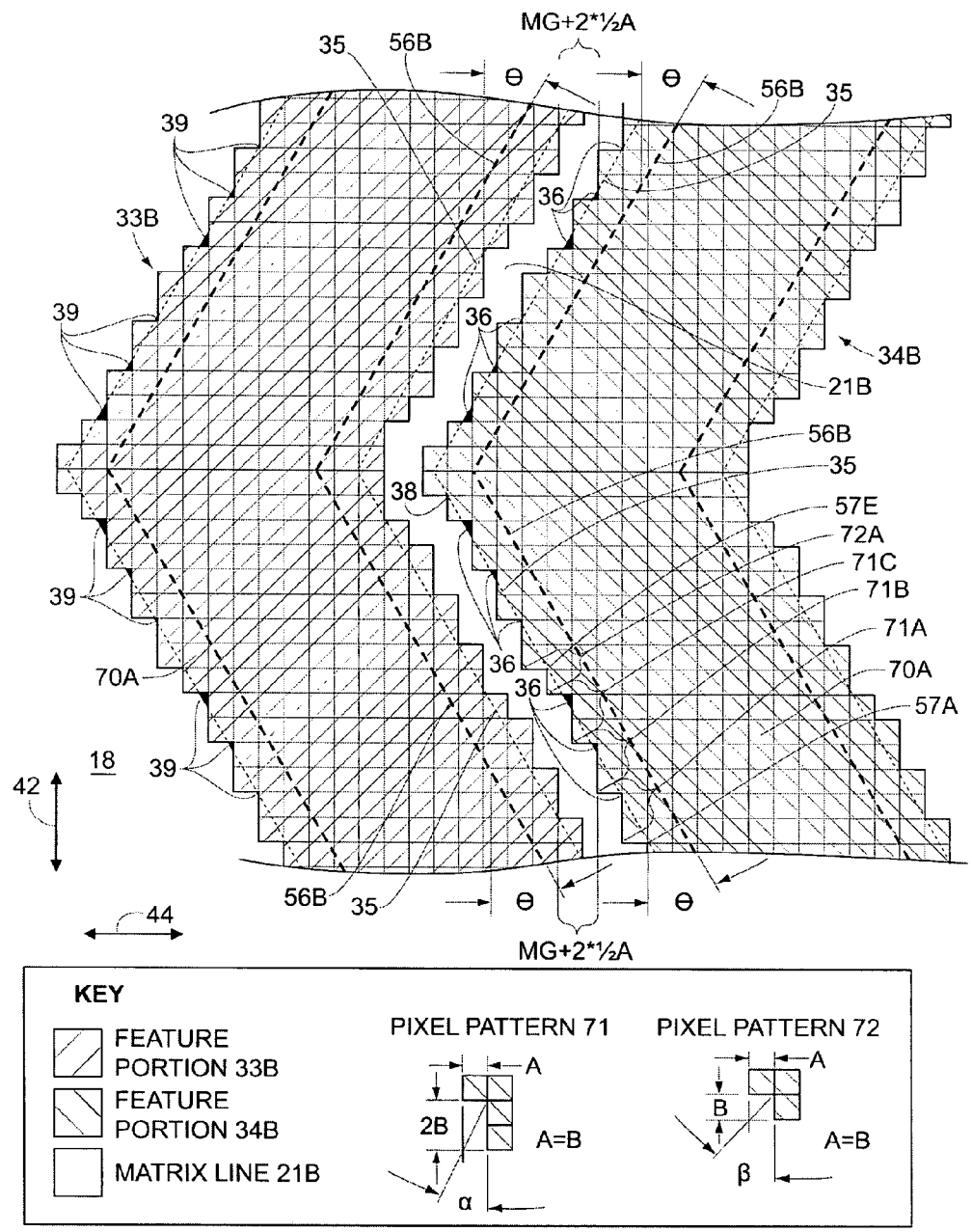
FIG. 5C shows a larger view of the feature portion and matrix line of FIG. 5B.

FIG. 5C shows a larger view of the feature portions 33B and 34B and matrix line 21B of FIG. 5B. FIG. 5C shows how undesired non-overlapped regions 36 are created by various arrangements of pixels 70A. Feature portions 33B and 34B and matrix line 21B are patterned or shaded for clarity. In this case features portions 33B and 34B are part of chevron-shaped features. As previously described, various matrix line edges 56B are skewed with respect to a scanning direction by angle θ, which in this case is equal to 30 degrees. Edges of feature portions 33B and 34B are formed with various patterns of pixels 70A. Each pixel 70A is sized as previously described. These pixels patterns have been repeated as the scanning proceeded along a direction parallel to main-scan axis 42. The pixels 70A in the patterns are arranged in various stair-case fashions. In this case, the edges of feature portion 33B and 34B have been formed with several pixel patterns 71 and pixel patterns 72. Each pixel pattern 71 includes a stair-case arrangement of pixels 70A whose pixel edges form a rise equal to 2*B for run equal to A, while each pixel pattern 72 includes a stair-case arrangement of pixels 70A whose edges form a rise equal to 1*B for a run equal to 1*A. In this example, "rise" refers to a direction that is parallel to main-scan axis 42, whereas "run" refers to a direction that is parallel to sub-scan axis 44. Pixel patterns 71 and 72 are identified in the KEY of FIG. 5C.

Pixel patterns 71 and 72 have been arranged to align the edge of feature portions 33B and 34B as closely as possible to the orientation of matrix line 21B. That is, pixel patterns 71 and 72 are arranged along a direction that attempts to match the direction of the skewed matrix lines. However, the sizes of each pixel 70A in each of pixel patterns 71 and 72 have resulted in alignment that does not exactly match the required skewed orientations of matrix line 21B. The steps created by the pixels stair-case arrangement of each of pixel patterns 71 and 72 can be characterized by various pitch angles. For example, the pixels in pixel pattern 71 are arranged to produce a pitch angle $\alpha$, and the pixels in pattern 72 are arranged to produce a pitch angle $\beta$. In this case since A=B, and pitch angle $\alpha$ is approximately equal to 26.6 degrees (i.e. $\tan^{-1}$ (A/2 B)) and pitch angle $\beta$ is equal to 45 degrees (i.e. $\tan^{-1}$ (A/B)). Neither pitch angle $\alpha$ nor pitch angle $\beta$ is equal to the required skew angle equal to $\theta$.

Pixel patterns 71 and 72 have been arranged to attempt to maintain the required minimum overlap and gap criteria as closely as possible. As shown in FIG. 5C, pixel patterns corresponding to the edges of feature portions 33B and 34B are nested with respect to each other over matrix line 21B to establish a gap between the feature portions that is not smaller than that defined by the (MG+2*½A) relationship. However, since pixel patterns 71 and 72 have been arranged to produce the various feature edges with inclinations that only approximate the corresponding skewed inclination of matrix line 21B, the minimum required overlap (MRO) criteria has not been fully maintained. The staircase edges of feature portion 33B that overlaps matrix line 21B maintain an overlap substantially equal or greater than the required MRO value defined by the corresponding MRO boundary lines 35. The edge of feature portion 34B that overlaps matrix line 21B however does not completely maintain an overlap that is substantially equal or greater than the required MRO value defined by its corresponding MRO boundary lines 35. Specifically, regions 36 which are darkened for clarity show various regions of matrix line 21B that are not overlapped as per the minimum requirements defined by the MRO value. In the case of color filters, portion of a matrix line which are not properly overlapped by the surrounding color features can lead to visual artifacts which can detract from the quality of the display.

Non-overlapped regions 36 vary in size. The sizes vary since the pixel patterns 71 and 72 only approximate the required inclination of the feature edge they represent. For example, pixel pattern 71A starts at a position 57A at which the MRO requirements are substantially met at that position. However as scanning proceeds, the stair case arrangement of pixels of patterns 71B and 71C form progressively larger non-overlapped regions 36 (pixel patterns 71A, 71B and 71C are members of pixel patterns 71). The arrangement of pixels 70A in each pixel pattern 71 repeats in a direction whose inclination does not match the inclination of matrix line 21B thereby compromising the MRO requirements. Pixel pattern 72A, which is a member of pixel patterns 72, has been introduced to correct for the misalignment and the overlap at point 57E is once again substantially equal to the required MRO value. However, since this correction would be followed by additional pixel patterns 71 while forming other parts of feature portion 31B, the misalignment once again repeats and the MRO is again adversely impacted.

It will now become apparent to those skilled in the art, that the illustrated misalignment arises from the size of pixels 70A that are used to form the various pixel patterns. The various stair-cased patterns created by the pixels 70A have associated pitch angles that are not equal to angle $\theta$. This difference leads to the formation of feature portion 33B with an edge that is inclined to form overlaps that are typically greater than the required MRO value. Conversely, this difference leads to the formation of feature portion 34B with an edge that is inclined to form overlaps that are typically less than the required MRO value. It is to be noted in this example that feature portion 33B is identical in form to feature portion 34B and therefore also has an edge which would likely form non-overlapped regions 39 that are similar to regions 36.

One possible approach for correcting the overlap deficiency associated with feature portion 34B would be to form it at a position that is more inboard within matrix line 21B. In this example, feature portion 33B is part of a first image swath formed during a first scan and feature portion 34B is part of a second image swath formed during a second scan (i.e. feature portion 33B is part of a red feature formed during the first scan and feature portion 34B is part of a green feature formed during the second scan). Typically, imaging systems can adjust the position of the image swaths in a cross-scan direction with a granularity that is finer than the pixel size along the cross-scan direction. However, although it would be possible to compensate for the reduced overlaps by partially shifting the image swath corresponding to feature portion 34B (i.e. to the left in this case) this would result in a gap between the two feature portions that is less than the required (MG+2*½ A) value and this could lead to other difficulties as previously discussed. Additionally shifting the image swath corresponding to feature portion 33B to the left to compensate for the reduced gap requirements would in turn reduce the size of the overlap associated with the feature portion 33B over matrix line 21B to levels below the required MRO. Another option for dealing with the reduced overlap associated with the feature portion 34B would be to further increase the line width of the matrix line 21B, but this is counter to the industry desire to reduce the matrix line widths in color displays.

Figure 6:
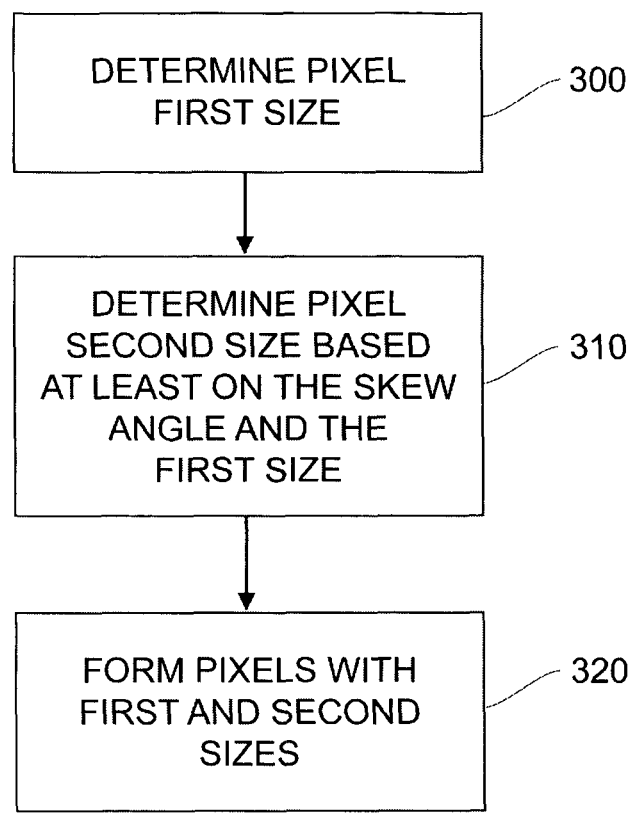
FIG. 6 is a flow chart for imaging one or more features with skewed edges as per an example embodiment of the invention.
Figure 7A:
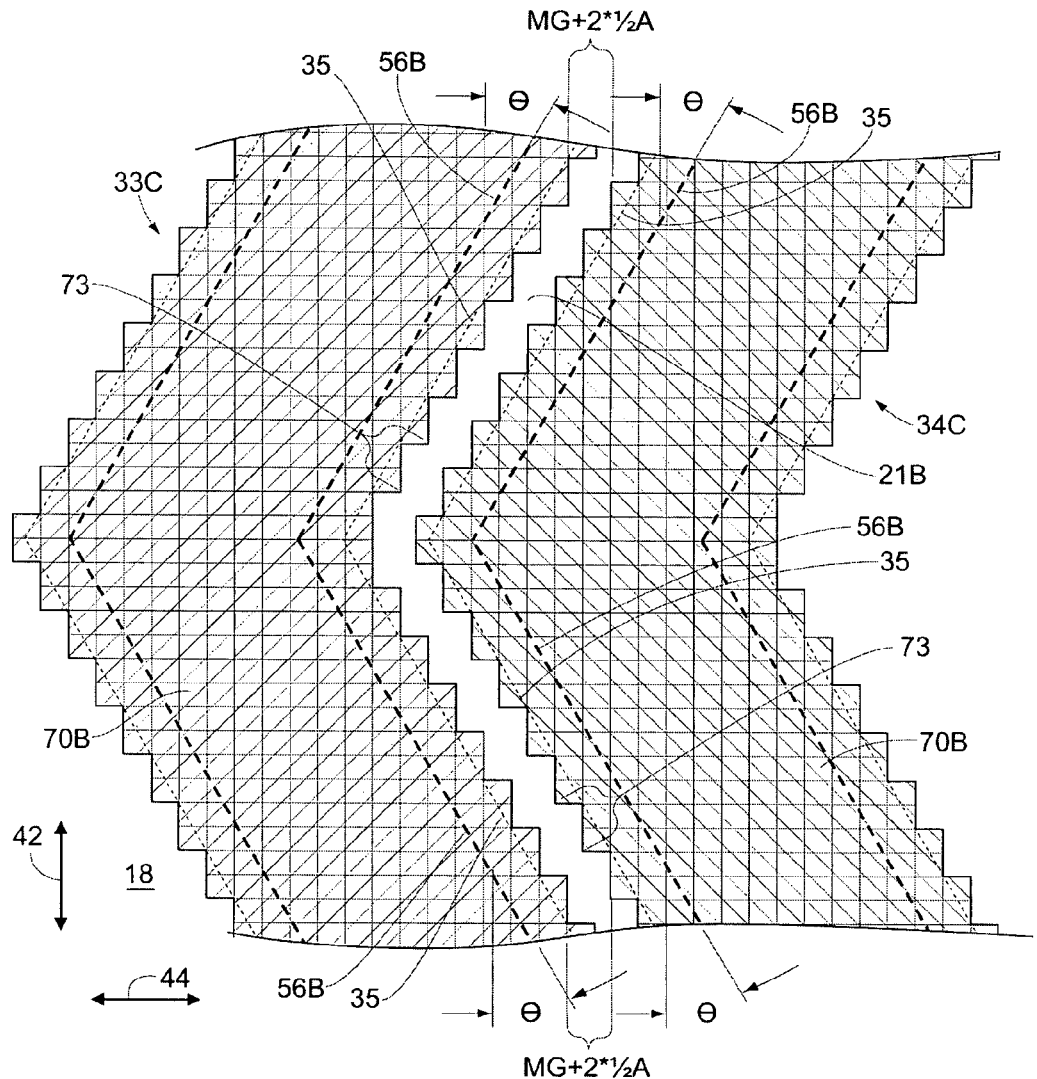
FIG. 7A shows patterns of pixels that are sized as per an example embodiment of the invention.

FIG. 6 shows a flow chart for imaging one or more features by controlling an imaging head to emit radiation beams while scanning in a scan direction as per an example embodiment of the invention. Each of the one or more features includes an edge portion that is skewed with respect to the scan direction. In this example embodiment, the feature portions 33C and 34C (as shown in FIG. 7A) are formed. It is desired that features portions 33C and 34C be formed such that they are more accurately aligned with matrix line 21B than the corresponding conventionally imaged feature portions 33B and 34B were in FIG. 5C.

The process begins a step 300 where a first size of a plurality of pixels to be formed on receiver element 18 is determined. In this example embodiment, each of the pixels to be formed will be identically sized. Each of the pixels is to be sized with the first size along a first direction and a second size along a second direction that intersects the first direction. In this example embodiment, the first size is along a cross-scan direction. The first size is parallel to sub-scan axis 44 in this example embodiment. The first size corresponds to the resolution of the imaging head 26 in cross-scan direction. In some example embodiments of the invention, imaging head 26 has a fixed cross-scan resolution while in other embodiments, the imaging head can be controlled to vary the cross-scan resolution.

Features can be arranged in different patterns. In some patterns, the features are regularly arranged along one or more directions. In such patterns, each feature includes a common reference, and the features are arranged such that each of the common references is separated from one another by an equal distance along an arrangement direction of the pattern of features. This equal distance is referred to as "pitch". Common references can include a feature edge, a feature corner, a feature center point, etc. In some patterns, the features are regularly arranged along one or more directions.

Figure 8A:
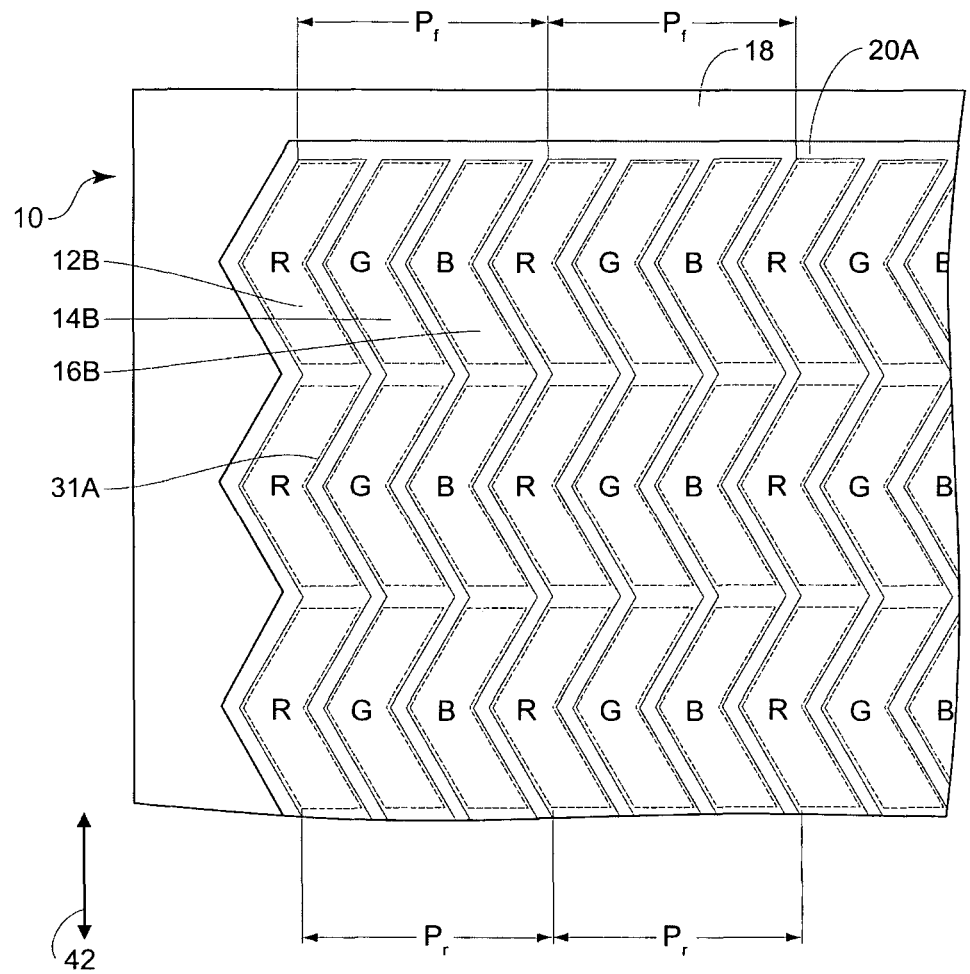
FIG. 8A is a plan view of a desired alignment of color filter features with a color filter matrix.

FIG. 8A shows an example of a desired alignment of a pattern of features with a registration region that includes a pattern of registration sub-regions. In this example, a stripe configuration color filter 10 similar to that shown in FIG. 1E is shown. In this case, the stripes bend from side to side as they extend in a direction parallel to the scan direction. In this example, each feature extends along a direction that is parallel to main-scan axis 42 and the features are regularly arranged along a direction that is parallel to sub-scan axis 44. Color filter 10 includes matrix 20A (partially shown in small broken lines) that in turn includes a pattern of evenly spaced cells 31A formed on a receiver element 18. In this case, it is desired that red (R) features 12B, green (G) features 14B and blue (B) features 16B be formed in substantial alignment with matrix 20A to form a "stripe configuration" color filter. Accordingly, in this example, it is desired that the pitch "$P_f$" of each respective pattern of red features 12B, green features 14B and blue features 16B substantially equal the pitch "$P_r$" of the pattern of corresponding cells 31A.

Figure 8B:
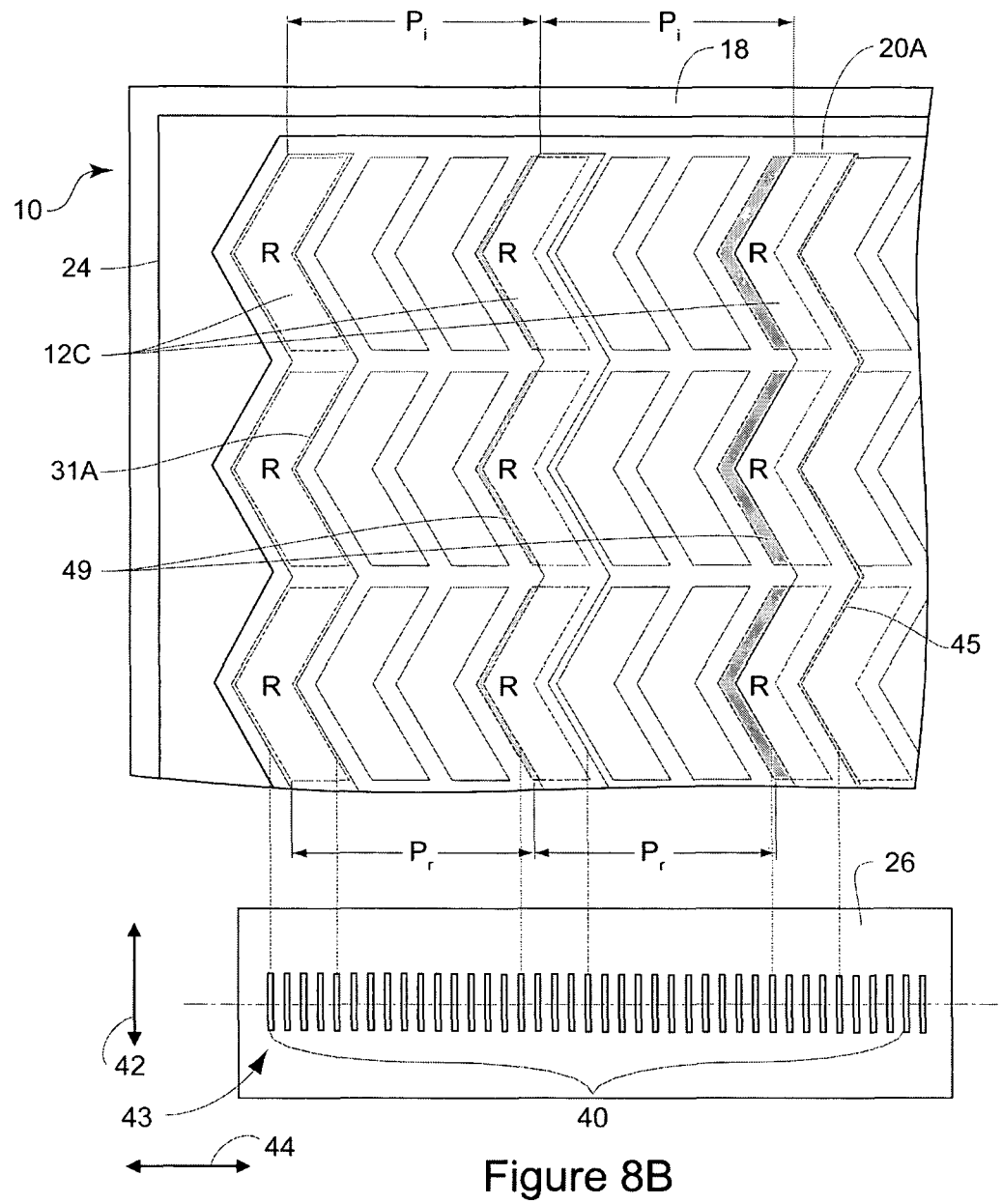
FIG. 8B schematically shows a laser-induced thermal transfer process being used to fabricate the color filter of FIG. 8A with an incorrect cross-scan resolution.

FIG. 8B schematically shows an imaging process that forms imaged features 12C in an attempt to image desired red features 12B in correct alignment with cells 31A as required by FIG. 8A. For clarity, the imaging steps corresponding to desired green features 14B and blue features 16B are not shown. Imaging head 26 includes a channel array 43 of individually addressable channels 40 that are uniformly sized and which repeat along an arrangement direction of the array. In this case, the arrangement direction is parallel to sub-scan axis 44. Each of the channels can emit radiation beams that form image pixels having a first cross-scan resolution.

FIG. 8B schematically shows the difficulties of imaging the pattern of features with this first cross-scan resolution. Proper registration requires that the imaged red features 12C be formed with a pitch that matches the pitch $P_r$ of the cells 31A. FIG. 8B shows that this requirement is not met. Essentially, the first-cross scan resolution cause imaged red features 12C to be formed with an initial pitch $P_i$ that is not equal to $P_r$.

The ability to control the size and position of each of the imaged red features 12C is a function of pixel size. The radiation beams generated by imaging head 26 each create a pixel size along the cross-scan direction that cannot form the imaged pattern of imaged red features 12C with a pitch that matches the desired pattern of red features 12B. Although the resolution of the imaging channels 40 may, or may not cause each of the images red features 12C to be imaged with a size along a cross-scanning direction that is equal the corresponding size of desired red features 12B, the resolution is such that the desired pitch cannot be matched.

As shown in FIG. 8B, some of the imaged red features 12C are offset from corresponding cells 31A by varying amounts. In this case some of the offsets have increased to a point in which one of the red features 12C would be overlapped by other features imaged with other color donor elements in region 45 of matrix 20A. Also, in regions 49, some matrix cells 31A have not been completely covered with a red feature 12C leading to a potential for a color-less void. Both these effects can lead to undesired visual characteristics in the final color filter. It becomes apparent that these effects can be additionally compounded as arrangements of larger number of imaging channels 40 are employed to enhance imaging productivity. Regions 45 and 49 are shaded for clarity.

Figure 8C:
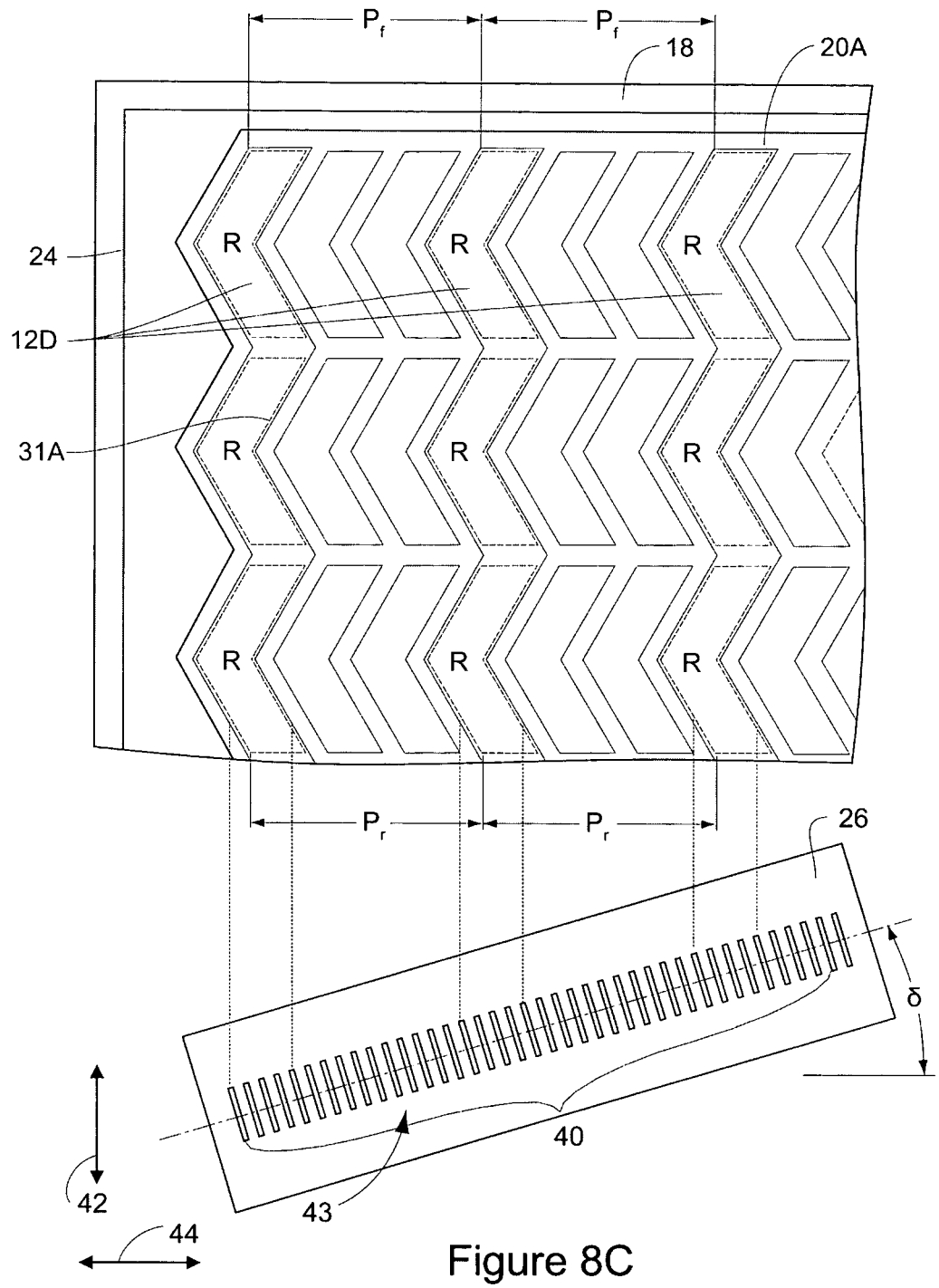
FIG. 8C schematically shows an imaging of the color filter of FIG. 8A as per an example embodiment of the invention.

FIG. 8C schematically shows an imaging of the receiver element 18 shown in FIG. 8A as per an example embodiment of the invention. FIG. 8C shows only an imaging process related to desired red features 12B. Desired green features 14B and blue features 16B are not considered for clarity, but can treated in much the same fashion as the imaging of desired red feature 12B. Red features 12D are imaged with the same imaging head 26 shown in the imaging process shown in FIG. 8B. In accordance with this aspect of the invention, imaging head 26 is rotated by an angle δ about an axis intersecting a plane of receiver element 18 over which radiation beams are scanned. Angle δ is shown as measured between sub-scan axis 44 and an arrangement direction of imaging channels 40. Angle δ is selected so that the resolution of the rotated imaging head 26 is appropriately sized to cause the imaged pattern of red features 12D to be formed with a pitch $P_f$ that is substantially equal to the pitch $P_r$ of cells 31A. Rotation of imaging head 26 causes a size of the imaged pixels to change. The resulting size of the imaged pixels may, or may not cause imaged red features 12D to be formed with cross-scan sizes that are equal to the corresponding cross-scan sizes of the red features 12B shown in FIG. 8A. However, by adjusting the pixels to a size appropriate for the required pitch, many of the previously described artifacts that would arise from mismatched pitches are substantially avoided.

Although in FIG. 8C, imaging head 26 was rotated by angle δ as referenced from sub-scan axis 44, it is understood that other references could just as easily be used.

Figure 8D:
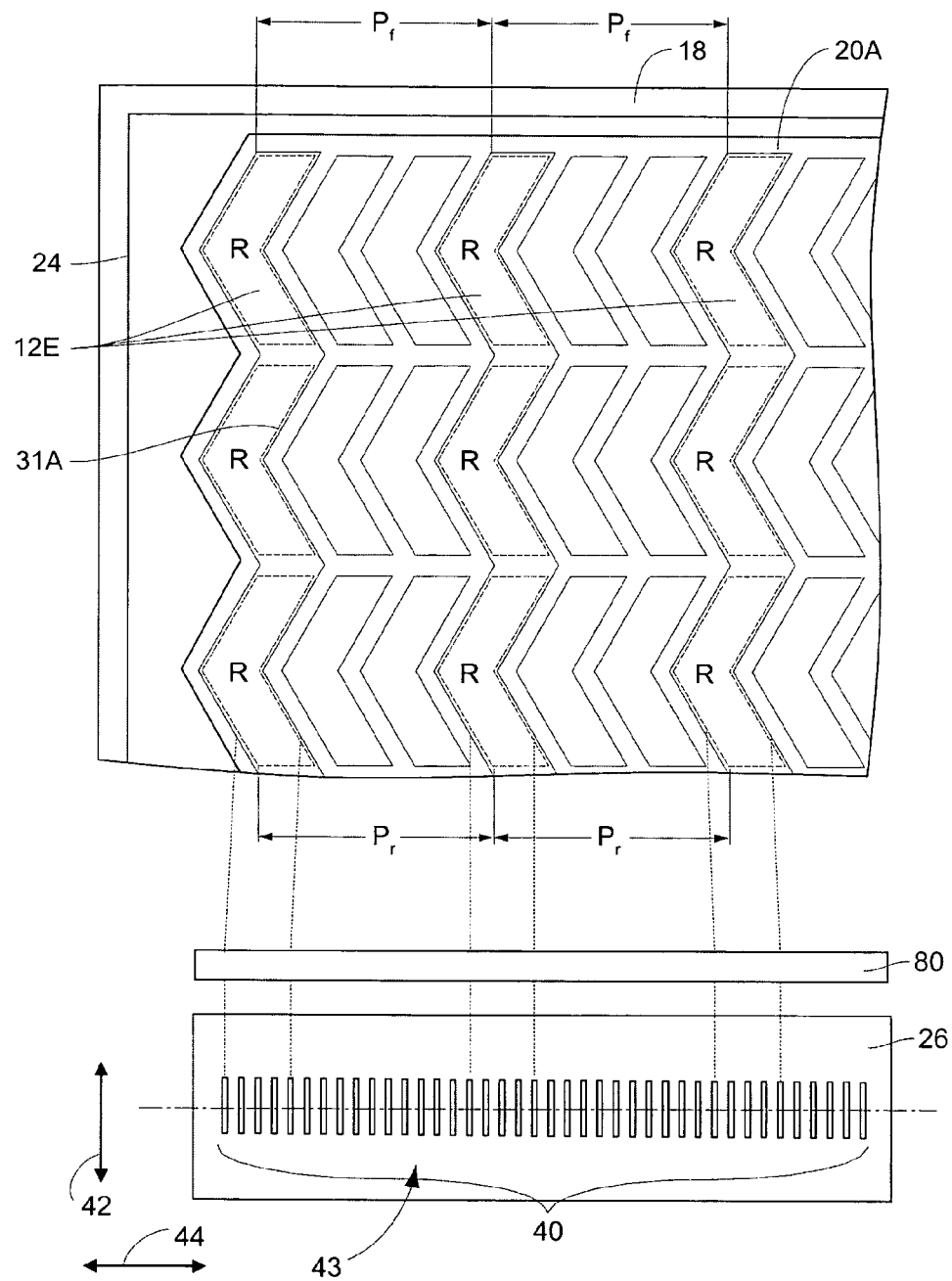
FIG. 8D schematically shows an imaging of the color filter of FIG. 8A as per an example embodiment of the invention.

Other methods can be employed to change a size of an imaged pixel in directions that intersect the scanning direction. FIG. 8D schematically shows the imaging of the receiver element 18 shown in FIG. 8A as per another example embodiment of the invention. For clarity, FIG. 8D shows only an imaging process related to desired red features 12B. As per this embodiment of the invention, imaging head 26 includes zoom mechanism 80. Zoom mechanism 80 adjusts a size of the radiation beams emitted by imaging head 26 such that the pattern of imaged red features 12E is imaged with a pitch $P_f$ that is substantially equal to the pitch $P_r$ of cells 34.

Figure 9:
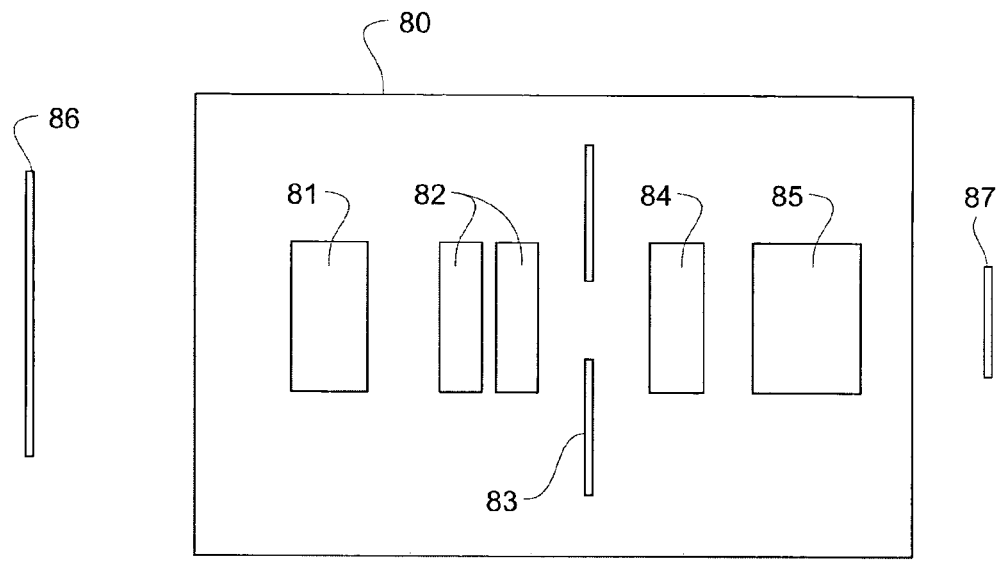
FIG. 9 is a schematic representation of a zoom system employed by an example embodiment of the invention.

FIG. 9 schematically shows a zoom system 80 that can be employed by various example embodiments of the invention. Zoom system 80 includes a fixed field optical component 81, two or more movable zoom optical components 82, an aperture stop 83, a fixed optical component 84 and a moveable focus optical component 85. In these example embodiments, aperture stop 83 is located between the zoom optical components 82 and the fixed optical components 84. Zoom mechanism 80 maintains the locations of the object plane 86 and the image plane 87 through the zoom adjustment range. The location of the zoom optical components 82 is moved between various positions to set the magnification of the optical system. Each of the optical components can include one or more lenses. One or more of the optical components can be anamorphic. Other types of zoom mechanisms can also be employed by this invention.

A required pitch may be determined in various ways. For example, the pitch of a pattern of registration sub-regions (e.g. a pattern of cells in a color filter matrix) can be determined by direct measurement. Various optical sensors can be used to detect the position of various registration sub-regions and the detected positions can be use to determine the pitch between the sub-regions. Sizes of image pixels, radiation beams or the imaged swath itself can also be determined by direct measurement. Various pitches can be determined in various directions and need not be limited to directions that intersect the scan direction. Patterns of features can include patterns of features in which the features are regularly arranged along different directions.

Referring back to step 300 in FIG. 6, it becomes clear that the first size of the pixels to be formed can be selected or determined based on various criteria. These criteria can include, but are not limited to, an inherent resolution of imaging head 26, a desire to form a pattern of features with a particular pitch, or to form a feature with a particular size. When features are regularly arranged along a first direction, the size along the first direction of the pixels used to form the features can be determined based at least on the required pitch of the features along the first direction. In some example embodiments of the invention, the first size is selected so that the pitch is equal to an integer multiple of the first size. In this illustrated example embodiment of the invention, the first size is along an edge of a pixel. In other example embodiments of the invention, the first size can be along other portions of the pixel.

In step 310, the second size of the pixels to be formed is determined based on various parameters. In this example embodiment, the second size of the pixels to be formed is determined based at least on a required skew angle and the first size. Imaged features can include various edges that extend in various directions. Some of these directions will be skewed by various skew angles relative to a desired scan direction. In this illustrated embodiment, it is desired that each of the feature portions 33C and 34C be formed such that some of their edges extend along a direction that is skewed by a desired skew angle relative to the scan direction. In this example embodiment, the desired skew angle is equal to θ, which in this case represents orientations of various portions of matrix line 21B. In this example embodiment of the invention, identically sized pixels are to be arranged in various patterns made up of stair-case arrangements of the pixels. FIG. 7A shows an example of pixels 70B which include a first size along a first direction and second size along second direction that intersects the first direction and which is determined based at least on the skew angle and the first size. Pixels 70B are arranged in pixel patterns 73 and are used to form various edge portions of each of the features portions 33C and 34C.

In this example embodiment each of the pixels 70B includes a first size C in a first direction that is parallel to sub-scan axis 44 and a determined second size D in a second direction that is parallel to main-scan axis 42. In this example embodiment first size C is equal to size A of the conventionally imaged pixels 70A shown in FIGS. 5B and 5C. Each pixel pattern 73 includes a stair-cased arrangement of pixels 70B whose edges form a rise of two pixels for every run of one pixel. In this example embodiment of the invention the stair-case patterns 73 repeat along a direction that is skewed with respect to the scan direction by the desired skew angle (i.e. θ in this case). A consistent minimum required overlap (MRO) is maintained between skewed matrix line 21B and the feature portions 33C and 34C.

The second size of pixels 70B has been determined to establish this alignment and in this example embodiment of the invention was determined by the following relationship:

$$N*D=(M*C)/\tan(\theta), \quad (6)$$

where:
D is the size of the pixel along the second direction;
C is the size of the pixel along the first direction;
θ is an angle corresponding to the skew angle;
M is an integer greater than, or equal to 1; and
N is an integer greater than, or equal to 1.

In this example embodiment, θ represents an orientation of the matrix lines 21B, but is not limited as such and can represent other desired orientations with respect to the scan direction of a feature edge.

Figure 7B:
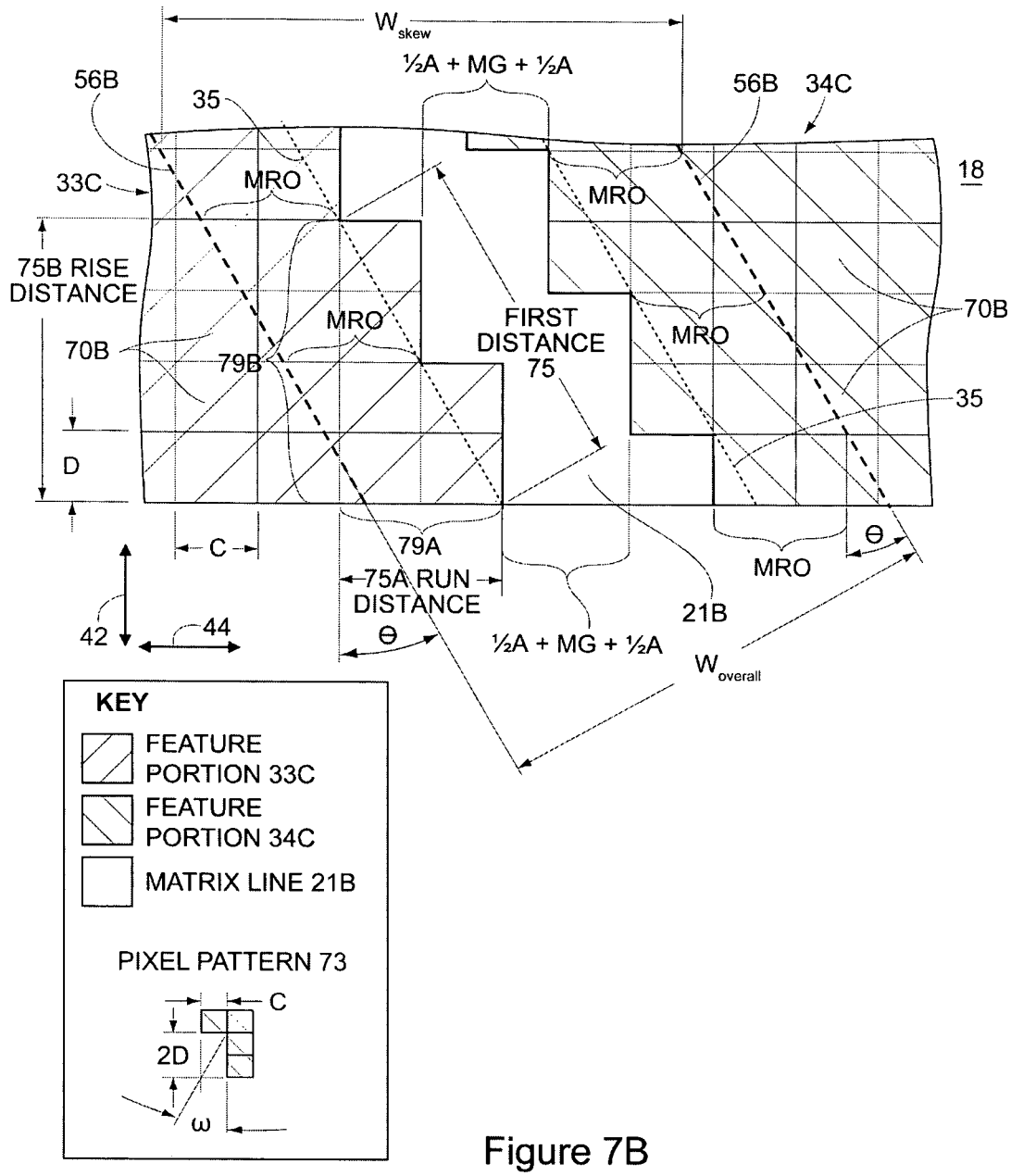
FIG. 7B shows a detailed view of the patterns of pixels of FIG. 7A.

In this example embodiment of the invention, M=1, N=2, θ=30 degrees and size C=A (i.e. the same size in the cross-scan direction of the conventionally imaged pixels 70A). First size C does not equal second size D. In this example embodiment of the invention, the second size is along an edge of a pixel. In other example embodiments of the invention, the second size can be along other directions. The steps created by the pixels stair-case arrangement of each of pixel patterns 73 can characterized by a pitch angle ω that is equal to the skew angle (i.e. θ in this case). Feature portions 33C and 34C are thus formed in accurate alignment with matrix line 21B, while maintaining the required overlap and gap requirements. The non-overlapped regions 36 shown in FIG. 5C are not present and a color filter with improved visual quality results. Additionally, the width of matrix line 21B need not be increased as can be required when conventional imaging techniques are employed. FIG. 7B shows a detailed view of the pattern 73 of pixels 70B.

FIG. 7B shows that feature portion 33C includes an edge portion that extends a first distance 75 along a direction that is skewed with respect to the scan direction. First distance 75 extends by a run distance 75A along a cross-scan direction for a rise distance 75B along the scan direction. The cross-scan direction is perpendicular to the scan direction and run distance 75A is different in length the rise distance 75B. Various groups of pixels 70B are formed. A first pixel group 79A extends along a first direction and a second pixel group 79B extends along a second direction that is perpendicular to the first direction. The first pixel group 79A includes pixels that each have a size C along the first direction and the second pixel group 79B includes pixels that each have a size D along the second direction. In this example embodiment of the invention, run distance 75A is equal to an integer multiple of size C and rise distance 75B is equal to an integer multiple of size D. In this example embodiment of the invention first pixel group 79A and second pixel group 79B share a common pixel.

Figure 10:
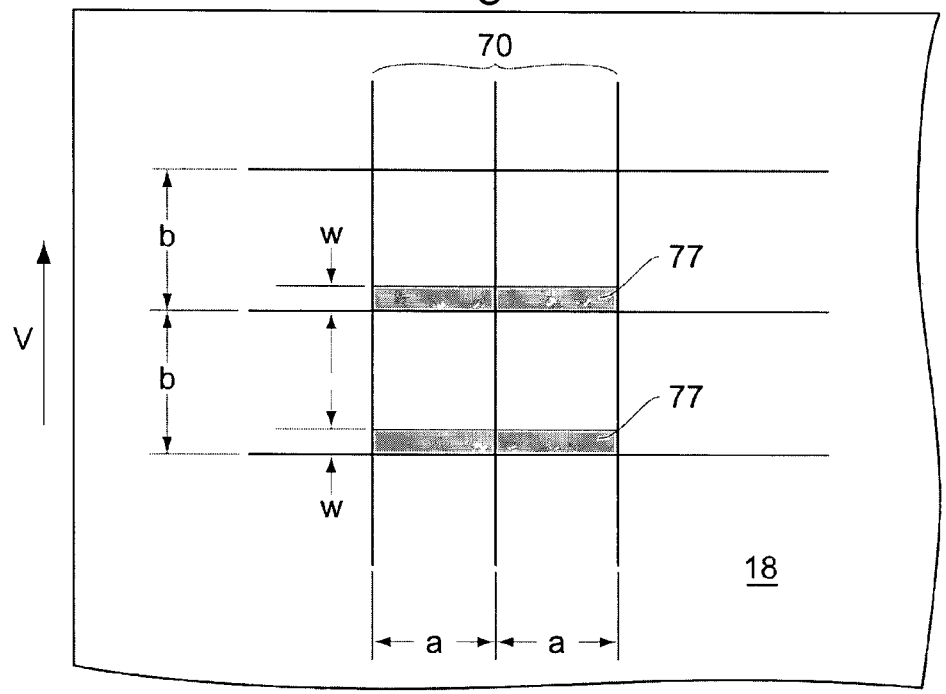
FIG. 10 schematically shows a grid-like arrangement of pixels formed by scanning radiation beams.

In step 330, the feature is formed in step 330 by operating imaging head 26 to emit radiation beams to form pixels having the first size along a first direction and having the second size along a second direction that intersects the first direction. In this example embodiment of the invention, the second size is parallel to the scan direction and the first size is parallel to a cross scan-direction. In this example embodiment of the invention, the second size is substantially parallel to main-scan axis 42 and direction and the first size is substantially parallel to sub-scan axis 44. Such pixel can be created in various manners. For example, FIG. 10 shows a grid-like arrangement of pixels 70 formed by scanning radiation beams over a receiver element 18. The size of each pixel 70 is characterized by various dimensions along different directions. Each of the pixels 70 has a dimension equal to size "b" along a scan direction associated with the formation of pixels 70 and a dimension equal to size "a" in a cross-scan direction. In this example, a particular size of each pixel 70 is produced by scanning a rectangular radiation spot 77 over the area of each pixel 70. The scanning is achieved as part of the overall scanning of the image. In order to scan spot 77 over the pixel region, a relative motion having a velocity "V" is required. The relative motion can be generated by moving the radiation spot 77, or by moving receiver element 18, or by moving both. In this case, the scan direction is parallel to the direction of the relative movement and the size of the spot in the scan direction is "w". The time that the laser spot dwells over any point of the media is defined by w/V. In this case, the size in the scan direction of each pixel 70 is a function of an initial size of a radiation beam "w" used to form the pixel and the duration of time in which that beam is scanned across receiver element 18. Although the size in the scan direction can be adjusted by varying velocity, this could result in a change in the exposure created by the radiation beam. One method of changing pixel size along the scan direction for a given scanning speed involves adjusting the length of time during which an imaging channel is activated. For example, in some imaging systems that include light valves, a timing signal that includes a pattern of timing pulses can be provided to all of the light valve elements and individual elements are activated in accordance with image data. The amount of time between the timing pulses is related to length of time that each light valve element is activated or not activated as a function of the image data and consequently defines a size along the scan direction of the pixels formed in accordance with the image data.

Rectangular radiation spots 77 can be created by various methods, including using rectangular apertures. The spot need not be rectangular however and can include other shapes as desired. Other methods of changing pixel sizes are also known in the art.

In some example embodiment of invention, pixel sizes along the scan direction are varied by adjusting the amount of time that a corresponding imaging channel 40 is activated while scanning radiation beams to form the pixels. Other example embodiments of the invention can vary pixel size along the scan direction by other methods.

It is to be noted that the stair-case arrangement of pixels 70B shown in this example embodiment of the invention is exemplary and other arrangements can also be used by various other example embodiments of the invention. For example, one or more pixels can make up the run of the arrangement while one or more pixels can make up the rise of the arrangement, so long as their sizes are chosen correctly to cause the arrangement of the pixels to be aligned along the desired direction. When a plurality of pixels makes up the run of the arrangement, each of the pixels can be formed at the same time by different imaging channels 40. That is, the different imaging channels 40 can be activated at the same time to form the pixels that make up the run of the arrangement.

Figure 7C:
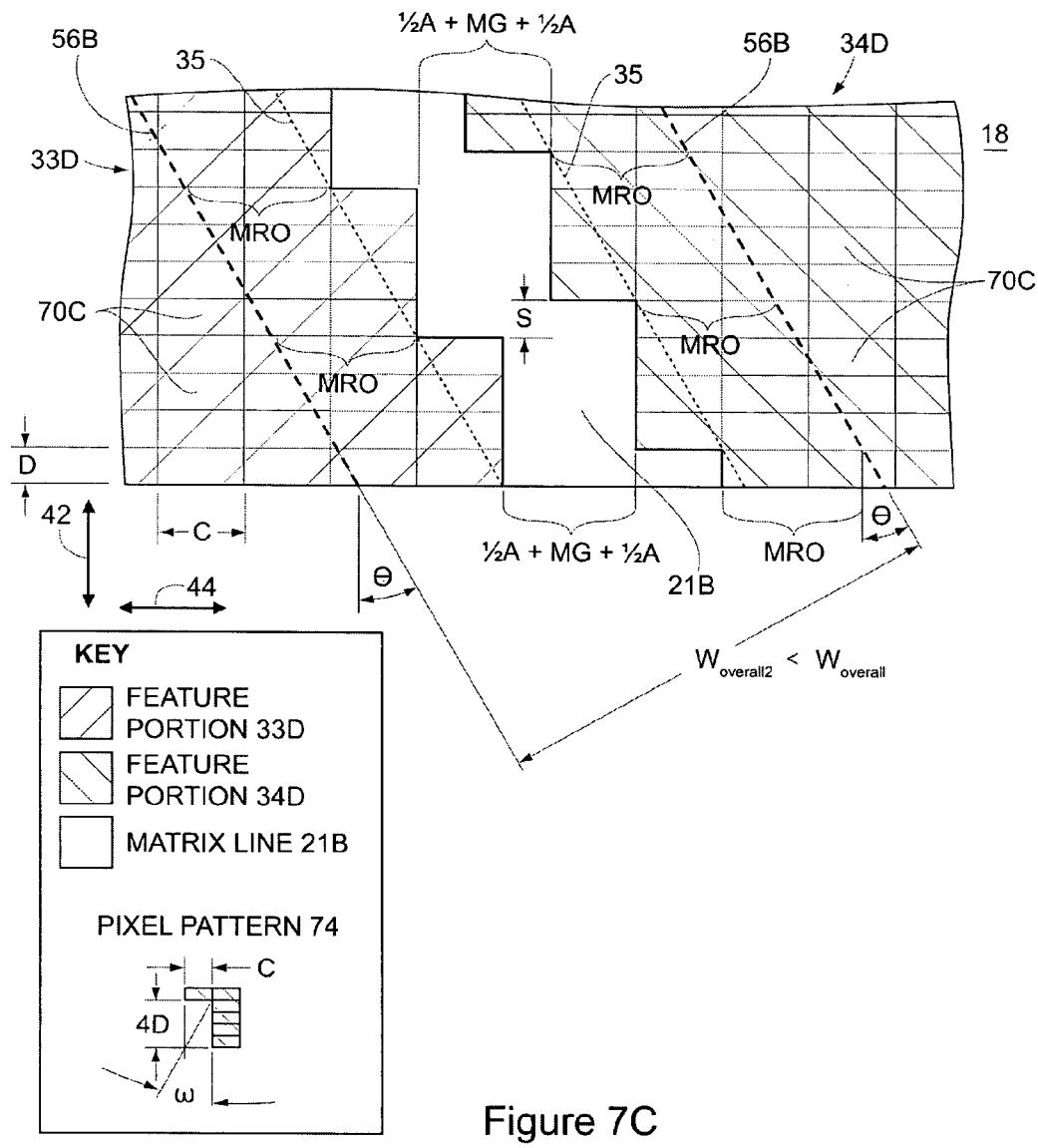
FIG. 7C shows other patterns of pixels that are sized as per an example embodiment of the invention.

FIG. 7C shows an example embodiment of the invention in which a pattern 74 of smaller pixels 70C was formed. Pixels 70C include a second pixel size D that was determined in accordance with equation (6) with M=1, N=4, θ=30 degrees and the first pixel size C of FIG. 7B. In addition to the previously described cross-scan gap requirements, FIG. 7C also shows that gap requirements along the scan direction equal to S also exist between feature portions 33D and 34D. S is the minimum distance related to the minimum gap requirements along the scan direction. Typically the minimum gap requirements along the scan direction are on the same order as the MG values in the cross-scan direction. In this example embodiment the minimum gap requirements along the scan direction are slightly less than their cross-scan counter parts. In this example embodiment, each of the features portions 33D and 33E were formed during different scans of imaging head 26 during different imagings. The pixels 70C that were used to image each of the features portions 33D and 33E are arranged in various grid patterns. Sub-scan positioning control of imaging head 26 (not shown in FIG. 7C) allows each of the pixels grids to be positioned with respect to one another with resolutions that are finer than the cross-can pixel size. However, in this example embodiment, since both feature portions 33D and 34E are formed from pixels 70C that are arranged in corresponding pixel grids that share a common origin along the scan direction, the minimum distance S is equal to an integer number of the second pixel size D that is greater than, or equal to the minimum gap requirements along the scan direction. In this example embodiment, a single pixel size D is required to account for the minimum gap requirements along the scan direction.

FIG. 7C shows an example embodiment in which smaller matrix line widths can be accommodated by exploiting the smaller gap requirements along the scan direction. FIG. 7C shows that feature portions 33D and 34D are nested in the scan direction much more closely than that shown in FIG. 7B. Closer nesting with the higher resolution pixels 70C still allow the minimum overlap requirements to be met along with the gap requirements both along and across the scan direction. Additionally and advantageously, the overall width $W_{overall2'}$ is smaller than the overall width $W_{overall}$ that is shown in FIG. 7B.

In some cases, the features in a pattern are regularly arranged in more than one direction. One example is an "island" configuration which includes chevron shaped features. To form the features in register with matrix 20, they must be formed with pitch along a first direction that in this example is parallel to a cross-scan direction as well with a pitch along a second direction that is parallel to the scan direction. Accordingly, forming the pattern of features with both these pitches in the scan direction and the cross-scan direction requires a pitch-based pixel resolution along the scan direction and a pitch-based pixel resolution along a cross-scan direction. This may, or may not conflict with a specific pixel resolution required by various embodiments of the present invention to cause the skewed edges of the features to be formed in required alignment with the skewed portions of matrix 20. An example of a possible conflict occurs when one of the features has been imaged with a cross-scan pixel size which is selected on the basis of matching the required pitch of the features in the cross-scan direction. The pixel size along the scan direction is then selected based on the cross-scan pixel size and the desired skew angle. The edges of the imaged features are formed with a stair-cased arrangement of these pixels such that the arrangement repeats in a direction that is parallel to the skewed lines of matrix 20. This however causes features to be formed with a pixel resolution in the scan direction that cannot meet the pitch requirement along the scan direction.

This resolution conflict can be corrected in various ways. In one example embodiment of the invention, once the pixel size along the scan direction (i.e. a scan size) is determined based on the size of the desired skew angle and the cross-scan size of the pixels required to match the cross-scan pitch of the features, the pixel size along the scan direction is additionally adjusted so that the overall size of an integer number of the pixels along the scan direction is equal to the required pitch of the features along the scan direction. For example, if the required pitch along the scan direction is equal to a non-integer number of the scan size, the non integer number is rounded up or down to the nearest integer number and the scan size is then adjusted to cause the integer number of adjusted scan sizes to equal the required pitch. The edges of the features will no longer be imaged with stair-case arrangement of pixels that repeat in a direction that is parallel to the desired skew angle, but will be slightly offset. Select skew angles that result in slight offsets on the order of a fraction of a micron are typically acceptable in color filter applications.

The intensity of radiation beams emitted by each imaging channel 40 can be varied in a number of different ways. In some example embodiments of the invention, imaging head 26 includes a spatial light modulator (light valve) that is illuminated by a constant laser source. The laser is driven by a constant current source adjusted to maintain a desired overall power. The light valve is used to attenuate the intensity of the radiation beams emitted from each channel of the light valve to a desired intensity for that channel.

In some example embodiments of the invention, the intensity of a radiation beam emitted by a given imaging channel 40 is adjusted in accordance with the position of a pixel formed by that beam in relation to other formed pixels. Individual pixels are formed in relation to one another to produce various portions of an imaged feature. It may be desired to form various pixels differently from one another to enhance imaging. For example, one or more pixels corresponding to edge portions of a feature may be imaged with radiation beams that have intensities that are different than the intensities of radiation beams that are used to image other portions of the feature. Pixels corresponding to edge portions need not be limited to the perimeter pixels of an imaged feature and can include one or more additional pixels that do not directly form the perimeter of the feature. The additional pixels can include inboard pixels of the imaged feature. In some example embodiments of the invention, corresponding edge portions of a feature may be imaged with radiation beams that have higher intensities than the intensities of radiation beams that are used to image other portions of the feature. The edge portions can be parallel to one of the scan or cross-scan directions, or can extend in a direction that intersects one of the scan direction and the cross-scan direction. Increasing the intensity of various radiation beams used to form edge portions of an imaged feature may be used to enhance a visual characteristic of the features and reduce artifacts such as edge discontinuities. Edge discontinuities can occur for a number of reasons. For example, differential thermal effects can arise near the transition between imaged and non-imaged areas. In the case of thermal transfer, mechanical effects, such as insufficient peel strength associated with the image-forming material transferred to the edges of the features or insufficient control of peel speed, angle or direction, may lead to edge discontinuities when the imaged donor element is peeled away. Selectively increased intensities can be used to help alleviate image artifacts such as edge discontinuities.

In some example embodiments of the invention, an imaging channel 40 is turned "on" to emit a radiation beam having an active intensity level greater than an inactive intensity level created when the channel is turned "off". This active intensity level may be incapable of forming a pixel on a media. In some example embodiments of the invention, the intensity level of the beam is below an intensity threshold. In some example embodiments, the intensity of the beam is controlled to create an exposure less than an exposure threshold of the media. Controlling an imaging channel to emit a radiation beam with these lower intensity levels is referred to as below-threshold imaging. Below-threshold imaging can be used to enhance a visual characteristic of image features and help reduce some image artifacts. For example, below-threshold imaging can be used to change a thermal characteristic in an area at, or near a pixel to improve a particular characteristic of that pixel. In the case of thermal transfer, below-threshold imaging techniques can be used to promote the adhesion of an image forming material that is transferred from a donor element to receiver element during the formation of a pixel. In some example embodiments, below-threshold imaging is used to vary the amount of image forming material that is transferred to a given pixel or a neighboring pixel. For example, in some thermal transfer processes, a stair-case arrangement of pixels can be formed along the edge of a feature by scanning radiation beams capable of equaling or exceeding an exposure threshold of the media. During the formation of the stair-case arrangement of pixels, additional radiation beams with intensities that are below threshold requirements scan proximate areas that are outboard from the feature's edge. These additional radiation beams may cause an additional transfer of image forming material from the donor element to the receiver element that partially fill in the pixel steps outboard of the feature edge thereby reducing the jaggedness of the stair-case edge. Media that behave in this manner and that are suitable for color filter applications can be used with thinner filter matrix lines since the features can be made to overlap the matrix line more evenly than stair-cased edges.

Imaging head 26 can comprise a multi-channel imaging head having individually-addressable imaging channels, each channel capable of producing a radiation beam operable for forming a pixel. Imaging head 26 can include various arrangements of imaging channels 40 including one-dimensional or two-dimensional arrays of imaging channels 40. Any suitable mechanism may be used to generate radiation beams. The radiation beams may be arranged in any suitable way.

Some embodiments of the invention employ infrared lasers. Infrared diode laser arrays employing 150 μm emitters with total power output of around 50 W at a wavelength of 830 nm have been used by the present inventors in laser induced thermal transfer processes. Alternative lasers including visible light lasers may also be used in practicing the invention. The choice of laser source employed may be motivated by the properties of the media to be imaged.

Various example embodiments of the invention have been described in terms of a laser induced thermal transfer processes in which an image forming material is transferred to a receiver element. Other example embodiments of the invention can be employed with other imaging processes and media. Images can be formed on media by different processes without departing from the scope of the present invention. For example, media can include an image modifiable surface, wherein a property or characteristic of the modifiable surface is changed when irradiated by a radiation beam to form an image. A radiation beam can be used to ablate a surface of media to form an image. Those skilled in the art will realize that different imaging processes can be readily employed.

A program product 97 can be used by controller 60 to perform various functions required by apparatus 90. One such function can include setting a pixel size for imaging head 26 as a function of desired skew angle of feature to be imaged and another size of the pixel. Without limitation, program product 97 may comprise any medium which carries a set of computer-readable signals comprising instructions which, when executed by a computer processor, cause the computer processor to execute a method as described herein. The program product 97 may be in any of a wide variety of forms. Program product 97 can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

In one example embodiment of the invention, program product 97 can be used to configure controller 60 to determine at least one size of a plurality of pixels to be formed on the media, such that each of the pixels has a first size along a first direction and a second size along a second direction that intersects the first direction. The plurality of pixels can be used to form a feature on the media, and the feature can have an edge that extends in a direction that is skewed by a skew angle with respect to a scan direction associated with the imaging. The second size is different than the first size and is determined based at least on the skew angle and the first size in accordance with the program instructions of program product 97. In the alternative, or additionally, controller 60 may permit manual assignment or adjustment of the pixel sizes under the guidance of an operator communicating with controller 60 through an appropriate user interface. Determination of the pixel sizes can be made on the basis of suitable algorithms and/or data inputted to controller 60, or programmed within program product 97. The pixel size parameters can be determined in advance of imaging or may be determined "on the fly" as imaging progresses.

In some example embodiments, controller 60 maintains intensity information 98 that specifies an increased intensity value for a radiation beam selected to form a particular portion of an imaged feature while scanning in a given scan direction. The portion of the feature can include an edge portion of the feature. The increased intensity values are greater than the intensity values of radiation beams used to form other portions of the feature while scanning in the corresponding scan direction.

In some example embodiments, controller 60 maintains intensity information 98 for each imaging channel 40 that specifies a below-threshold intensity to set for radiation beam emitted by an imaging channel 40 while scanning in a given scan direction.

Patterns of features have been described in terms of patterns of color features in a display. In some example embodiments of the invention, the features can be part of an LCD display. In other example embodiments of the inventions, the features can be part of an organic light-emitting diode (OLED) display. OLED displays can include different configurations. For example, in a fashion similar to LCD display, different color features can be formed into a color filter used in conjunction with a white OLED source. Alternatively, different color illumination sources in the display can be formed with different OLED materials with various embodiments of the invention. In these embodiments, the OLED based illumination sources themselves control the emission of colored light without necessarily requiring a passive color filter. OLED materials can be transferred to suitable media. OLED materials can be transferred to a receiver element with laser-induced thermal transfer techniques.

Various example embodiments of the invention have been described in terms of imaging chevron-shaped features. The invention however is not limited to imaging chevron shaped features but can be used to image features that include other shapes that have edges that are skewed with respect to a desired scanning direction. The invention can be used to image island features also.

While the invention has been described using as examples applications in display and electronic device fabrication, the methods described herein are directly applicable to other applications including those used in biomedical imaging for lab-on-a-chip (LOC) fabrication. LOC devices may include various patterns of features. The invention can have application to other technologies, such as medical, printing and electronic fabrication technologies.

It is to be understood that the exemplary embodiments are merely illustrative of the present invention and that many variations of the above-described embodiments can be devised by one skilled in the art without departing from the scope of the invention.

What is claimed is:

1. A method for forming an image on media, comprising:
controlling an imaging head to emit radiation beams to form the image while scanning over the media along a scan direction, wherein the image comprises a feature that includes an edge portion that extends in a direction that is skewed by a skew angle with respect to the scan direction, and wherein each radiation beam is controllable to vary a size of a pixel formed on the media by the radiation beam;
determining at least one size of each pixel of a plurality of pixels to be formed on the media, each pixel having a first size along a first direction and a second size along a second direction that intersects the first direction, wherein the second size is different than the first size and is determined based at least on the skew angle and the first size;
controlling the imaging head to emit a group of the radiation beams to form a stair-case arrangement of the plurality of pixels along the edge portion of the feature, wherein each radiation beam of the group of the radiation beams is controlled to form each of the pixels of the stair-case arrangement with the first size and the determined second size; and
comprising rotating the imaging head to form each pixel of the plurality pixels with a size equal to one of the first size and the determined second size.

2. A method according to claim 1, wherein the second direction is substantially perpendicular to the first direction.

3. A method according to claim 1, wherein the second direction is substantially parallel to the scan direction.

4. A method according to claim 1, wherein the feature is part of a pattern of features that are regularly arranged along the first direction, the method comprising determining the second size based at least on the pitch of the features along the first direction.

5. A method according to claim 4, wherein the features in the pattern of features are regularly arranged along the second direction, the method comprising determining the second size based at least on the pitch of the features along the second direction.

6. A method according to claim 5, wherein the second direction is substantially perpendicular to the first direction.

7. A method according to claim 4, wherein the pattern of features comprises a plurality of different colored features and the features for each color are imaged separately.

8. A method according to claim 4, wherein the pattern of features comprises a pattern of color filter features.

9. A method according to claim 1, wherein the feature is part of a pattern of features that are regularly arranged along the first direction, the method comprising determining the first size based at least on the pitch of the features along the first direction.

10. A method according to claim 1, comprising controlling the imaging head to form one or more additional pixels on the media, wherein each of the one or more additional pixels has a different size than each of the pixels in the stair-cased arrangement of pixels.

11. A method according to claim 1, wherein the stair-case arrangement of the pixels repeats along a direction that is parallel to the direction in which the edge portion extends.

12. A method according to claim 1, comprising controlling the duration of time during which each radiation beam of the group of the radiation beams is emitted to form each pixel of the plurality pixels with a size equal to one of the first size and the determined second size.

13. A method according to claim 1, wherein each radiation beam of the group of the radiation beams forms a corresponding radiation spot on the media, the method comprising controlling the duration of time during which each of the radiation spots is scanned across the media to form each pixel of the plurality pixels with a size equal to one of the first size and the determined second size.

14. A method according to claim 1, wherein each radiation beam of the group of the radiation beams forms a corresponding radiation spot on the media, the method comprising positioning each of the radiation spots at an angle about an axis that intersects a surface of the media over which the group of the radiation beams are scanned to form each pixel of the plurality pixels with a size equal to one of the first size and the determined second size.

15. A method according to claim 1, wherein each radiation beam of the group of the radiation beams forms a corresponding radiation spot on the media, the method comprising magnifying or de-magnifying each of the radiation spots to form each pixel of the plurality pixels with a size equal to one of the first size and the determined second size.

16. A method according to claim 1, wherein the imaging head is controllable to adjust a size of each pixel of the plurality pixels in the scan direction differently from a size of each pixel of the plurality pixels in a direction that intersects the scan direction.

17. A method according to claim 1, comprising controlling the imaging head to emit each radiation beam of the group of the radiation beams with a first intensity to form the stair-case arrangement of the plurality of pixels and controlling the imaging head to emit a second group of one or more of the radiation beams to form one or more additional pixels while scanning over the media, wherein each radiation beam of the second group of the radiation beams is emitted with a second intensity that is different from the first intensity.

18. A method according to claim 17, wherein the one or more additional pixels form part of an interior portion of the feature, the method comprising controlling the imaging head to make the second intensity lower than the first intensity.

19. A method according to claim 17, wherein the second intensity is below an intensity threshold of the media.

20. A method according to claim 1, comprising forming the image on the media with a thermal transfer process.

21. A method according to claim 1, wherein the feature is chevron shaped.

22. A method according to claim 1, wherein the stair-case arrangement includes a pitch angle that is equal to the skew angle.

23. A method according to claim 1, wherein at least two pixels of the plurality of pixels are formed at the same time.

24. A method according to claim 1, wherein each of the first size and the second size are along an edge of each pixel.

25. A method for forming an image on media, comprising:
controlling an imaging head to emit radiation beams to form the image while scanning over the media along a scan direction, wherein the image comprises a feature that includes an edge portion that extends in a direction that is skewed by a skew angle with respect to the scan direction, and wherein each radiation beam is controllable to vary a size of a pixel formed on the media by the radiation beam;
determining at least one size of each pixel of a plurality of pixels to be formed on the media, each pixel having a first size along a first direction and a second size along a second direction that intersects the first direction, wherein the second size is different than the first size and is determined based at least on the skew angle and the first size;
controlling the imaging head to emit a group of the radiation beams to form a stair-case arrangement of the plurality of pixels along the edge portion of the feature, wherein each radiation beam of the group of the radiation beams is controlled to form each of the pixels of the stair-case arrangement with the first size and the determined second size; and
comprising determining the second size based at least upon the relationship:

$$N*D=(M*C)/\mathrm{Tan}(\theta), \text{ wherein:}$$

C is the size of the pixel along the first direction;
D is the size of the pixel along the second direction;
θ is an angle corresponding to the skew angle;
M is an integer greater than, or equal to one; and
N is an integer greater than, or equal to one.